(12) United States Patent
Sangawa et al.

(10) Patent No.: US 7,151,423 B2
(45) Date of Patent: Dec. 19, 2006

(54) DEMULTIPLEXER AND MULTIPLEXER

(75) Inventors: Ushio Sangawa, Ikoma (JP); Hiroshi Kanno, Osaka (JP); Kazuyuki Sakiyama, Shijonawate (JP); Tomoyasu Fujishima, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/108,484

(22) Filed: Apr. 18, 2005

(65) Prior Publication Data

US 2005/0185679 A1 Aug. 25, 2005

Related U.S. Application Data

(63) Continuation of application No. PCT/JP2004/016582, filed on Nov. 9, 2004.

(30) Foreign Application Priority Data

Dec. 8, 2003 (JP) ............................. 2003-408422

(51) Int. Cl.
*H01P 5/12* (2006.01)

(52) U.S. Cl. .................. 333/134; 333/126; 333/128

(58) Field of Classification Search ............... 333/134, 333/204, 126, 128, 129, 132
See application file for complete search history.

(56) References Cited

U.S. PATENT DOCUMENTS

| | | | |
|---|---|---|---|
| 4,488,131 A | 12/1984 | Griffin et al. | |
| 5,101,181 A * | 3/1992 | Rauscher | 333/134 |
| 5,172,084 A * | 12/1992 | Fiedziuszko et al. | 333/204 |
| 5,438,572 A * | 8/1995 | Rauscher | 370/497 |
| 5,926,496 A * | 7/1999 | Ho et al. | 372/92 |
| 6,188,819 B1 | 2/2001 | Kosaka et al. | |
| 6,643,421 B1 * | 11/2003 | Chin et al. | 385/15 |
| 6,665,476 B1 * | 12/2003 | Braun et al. | 385/50 |
| 6,738,551 B1 | 5/2004 | Noda et al. | |
| 6,778,318 B1 * | 8/2004 | Sayyah et al. | 359/326 |
| 6,874,145 B1 * | 3/2005 | Ye et al. | 718/108 |
| 6,909,344 B1 * | 6/2005 | Toncich | 333/219.2 |
| 6,922,117 B1 * | 7/2005 | Karlquist | 333/132 |

FOREIGN PATENT DOCUMENTS

| | | |
|---|---|---|
| CA | 2383777 A1 | 3/2001 |
| JP | 62-224101 | 10/1987 |
| JP | 03-203421 A | 9/1991 |
| JP | 5-15502 U | 2/1993 |
| JP | 9083490 | * 3/1997 |

OTHER PUBLICATIONS

Konishi, Y., "Fundamentals and Applications of Microwave Circuits—from Basics to New Developments", 3rd Ed., pp. 306-307 (Jun. 1995).

(Continued)

*Primary Examiner*—Robert Pascal
*Assistant Examiner*—Kimberly E. Glenn
(74) *Attorney, Agent, or Firm*—Akin Gump Strauss Hauer & Feld, LLP

(57) ABSTRACT

A demultiplexer receives a multiplexed signal, in which a plurality of electrical signals with mutually different frequencies are multiplexed together, and divides the multiplexed signal into the electrical signals. The demultiplexer includes at least one line for propagating the multiplexed signal and a plurality of resonators arranged along the line. The dispersion characteristic of the line has a nonlinear portion, caused by electromagnetic coupling between the line and the resonators, and the phase velocities of the electrical signals which propagate through the line change according to their frequencies.

8 Claims, 22 Drawing Sheets

OTHER PUBLICATIONS

Ramesh Abhari et al. "Metallo-Dielectric Electromagnetic Bandgap Structures for Suppression and Isolation of the Parallel-Plate Noise in High-Speed Circuits", IEEE Transactions on Microwave Theory and Techniques, vol. 51, No. 6, 2003, pp. 1629-1639.

Lei Zhu, "Guided-Wave Characteristics of Periodic Coplanar Waveguides with Inductive Loading—Unit-Length Transmission Parameters", IEEE Transactions on Microwave Theory and Techniques, vol. 51, No. 10, 2003, pp. 2133-2138.

Carlo di Nallo et al. "Experimental Investigatiion on NRD-guide dual-mode filters", IEEE MTT-S Digest, 1994, pp. 237-240.

Waguih S. Ishak et al. "Tunable Microwave Resonators Using Magnetostatic Wave in YIG Films", IEEE Transactions on Microwave Theory and Techniques, vol. MTT-34, No. 12, 1986, pp. 1383-1393.

* cited by examiner

DEMULTIPLEXER AND MULTIPLEXER

This is a continuation of International Application PCT/JP2004/016582, with an international filing date of Nov. 9, 2004.

BACKGROUND OF THE INVENTION

1. Field of the Invention

The present invention relates to a demultiplexer that can divide a multiplexed signal, generated by superposing a plurality of pulsed signals with carriers having mutually different frequencies, according to the respective carrier frequencies. The present invention also relates to a multiplexer that can superpose those pulsed signals one upon the other.

2. Description of the Related Art

Recently, the technique of transmitting a multiplexed signal generated by superposing a plurality of pulsed signals with carriers having mutually different frequencies has attracted much attention in the art. To transmit such a multiplexed signal, a demultiplexer and a multiplexer are needed.

FIG. 22 shows a conventional demultiplexer including circulators and bandpass filters. A demultiplexer of this type is disclosed by Yoshihiro Konishi in "Fundamentals and Applications of Microwave Circuits—from Basics to New Developments", $3^{rd}$ edition, published Jun. 10, 1995, p. 306, FIG. 8.16.

In the demultiplexer shown in FIG. 22, circulators 192 are connected on multiple stages along a single line. A bandpass filter 193 branches from the circulator 192 on its associated stage. In FIG. 22, a number n of bandpass filters 193 are used.

An RF signal, incoming through an input port 191, is guided first by the circulator 192 on the initial stage to the bandpass filter 193 on the initial stage. The bandpass filter 193 on the initial stage has a passband F1 and outputs only selected frequency components of the RF signal received, falling within the passband F1, to an output port 194 on the initial stage. Meanwhile, the rest of the RF signal, i.e., the remaining frequency components thereof falling out of the passband F1, is guided by the circulator 192 on the initial stage to the circulator 192 on the next stage. This RF signal is output by the bandpass filter having a passband F2 to the output port.

Similar wavelength division is carried out on the third stage and so on. In this manner, the RF signal, in which a number of frequency components have been superposed one upon the other, can be divided according to desired passbands Fi (where i=1, 2, ... , and n).

Depending on the specifications of a given communication system, the demultiplexer may need to exhibit low loss and steep filtering characteristic. When the conventional demultiplexer is used in a milliwave communication system, a waveguide filter is often used as the bandpass filter 193.

A waveguide filter exhibits low loss in its passband and excellent attenuation ability in its stopband. However, it is hard to reduce the size and weight of a waveguide filter. Accordingly, if such a filter is used in a demultiplexer that needs a plurality of filters as shown in FIG. 22, then the demultiplexer will have an increased size and a higher price.

In order to overcome the problems described above, a primary object of the present invention is to provide a less expensive demultiplexer and multiplexer, which can effectively contribute to size and weight reduction.

SUMMARY OF THE INVENTION

A demultiplexer according to the present invention receives a multiplexed signal, in which a plurality of electrical signals with mutually different frequencies are multiplexed together, and divides the multiplexed signal into the electrical signals on a time base. The demultiplexer includes at least one line for propagating the multiplexed signal and a plurality of resonators arranged along the line. The dispersion characteristic of the line has a nonlinear portion, caused by electromagnetic coupling between the line and the resonators, and the phase velocities of the electrical signals which propagate through the line change according to their frequencies.

In one preferred embodiment, the plurality of resonators includes at least three resonators, which are arranged at substantially regular intervals.

In another preferred embodiment, the plurality of resonators shares a common structure.

In another preferred embodiment, electromagnetic coupling, produced between each of the resonators and the line, has substantially the same strength for each said resonator.

In another preferred embodiment, the demultiplexer further includes at least one more line for electrically coupling selected ones of the resonators together.

In another preferred embodiment, a number of demultiplexing areas are arranged along the line, and each of the demultiplexing areas includes at least two of the resonators.

In another preferred embodiment, the line is selected from the group consisting of a microstrip line, a coplanar line, a strip line, a slot line, an inverted microstrip line and a surface wave transmission line.

In another preferred embodiment, the resonators produce resonances at two or more different frequencies.

In another preferred embodiment, each said resonator is a multimode resonator, and produces resonances in mutually independent basic modes at two or more different frequencies.

In another preferred embodiment, each said resonator has a plurality of resonator elements, which are coupled together electromagnetically.

In another preferred embodiment, the interval between the resonators is approximately equal to half of a propagation wavelength at either the highest or lowest one of the frequencies of the electrical signals that are included in the RF signal which propagates through the line.

In another preferred embodiment, the resonant frequency of the resonators is approximately equal to either the highest or lowest one of the frequencies of the electrical signals that are included in the RF signal which propagates through the line.

In another preferred embodiment, the multiplexed signal is a temporally localized signal generated by superposing a plurality of pulsed signals one upon the other. The waveform of each said pulsed signal is represented by the product of a signal with a Gaussian waveform and a sine wave signal. And the pulsed signals have been generated from the sine wave signals with mutually different frequencies.

A multiplexer according to the present invention receives a plurality of electrical signals with mutually different frequencies at respectively different times and generates a multiplexed signal by multiplexing the electrical signals together. The multiplexer includes at least one line for propagating the electrical signals and a plurality of resonators arranged along the line. The dispersion characteristic of the line has a nonlinear portion, caused by electromagnetic coupling between the line and the resonators, and the phase velocities of the electrical signals which propagates through the line change according to their frequencies.

A device according to the present invention includes a demultiplexer for receiving a multiplexed signal, in which a plurality of electrical signals with mutually different frequencies are multiplexed together, and dividing the multiplexed signal into the electrical signals on a time base and a circuit for processing the electrical signals. The demultiplexer includes at least one line for propagating the multiplexed signal and a plurality of resonators arranged along the line. The dispersion characteristic of the line has a nonlinear portion, caused by electromagnetic coupling between the line and the resonators, and the phase velocities of the electrical signals which propagates through the line change according to their frequencies.

In one preferred embodiment, the device further includes an antenna for receiving the multiplexed signal.

In another preferred embodiment, the demultiplexer also functions as a multiplexer for receiving a plurality of electrical signals with mutually different frequencies at respectively different times and generating a multiplexed signal by multiplexing the electrical signals together.

In another preferred embodiment, the electrical signals are pulse signals and used in ultrawide-band communications.

According to the present invention, a number of resonators are arranged along a line and electromagnetic coupling is produced between the line and the resonators, thereby generating singularity in the dispersion characteristic of the line. By making a signal time delay frequency-dependent by taking advantage of this singularity of the dispersion characteristic, the multiplexed signal can be divided on the time base.

The demultiplexer of the present invention needs no big filters and can contribute to reducing the sizes, weights and prices of communication devices in the field of pulse communications that use a plurality of carriers with mutually different frequencies.

DETAILED DESCRIPTION OF PREFERRED EMBODIMENTS

First, the basic configuration and operating principle of a demultiplexer according to the present invention will be described.

Figure 1:
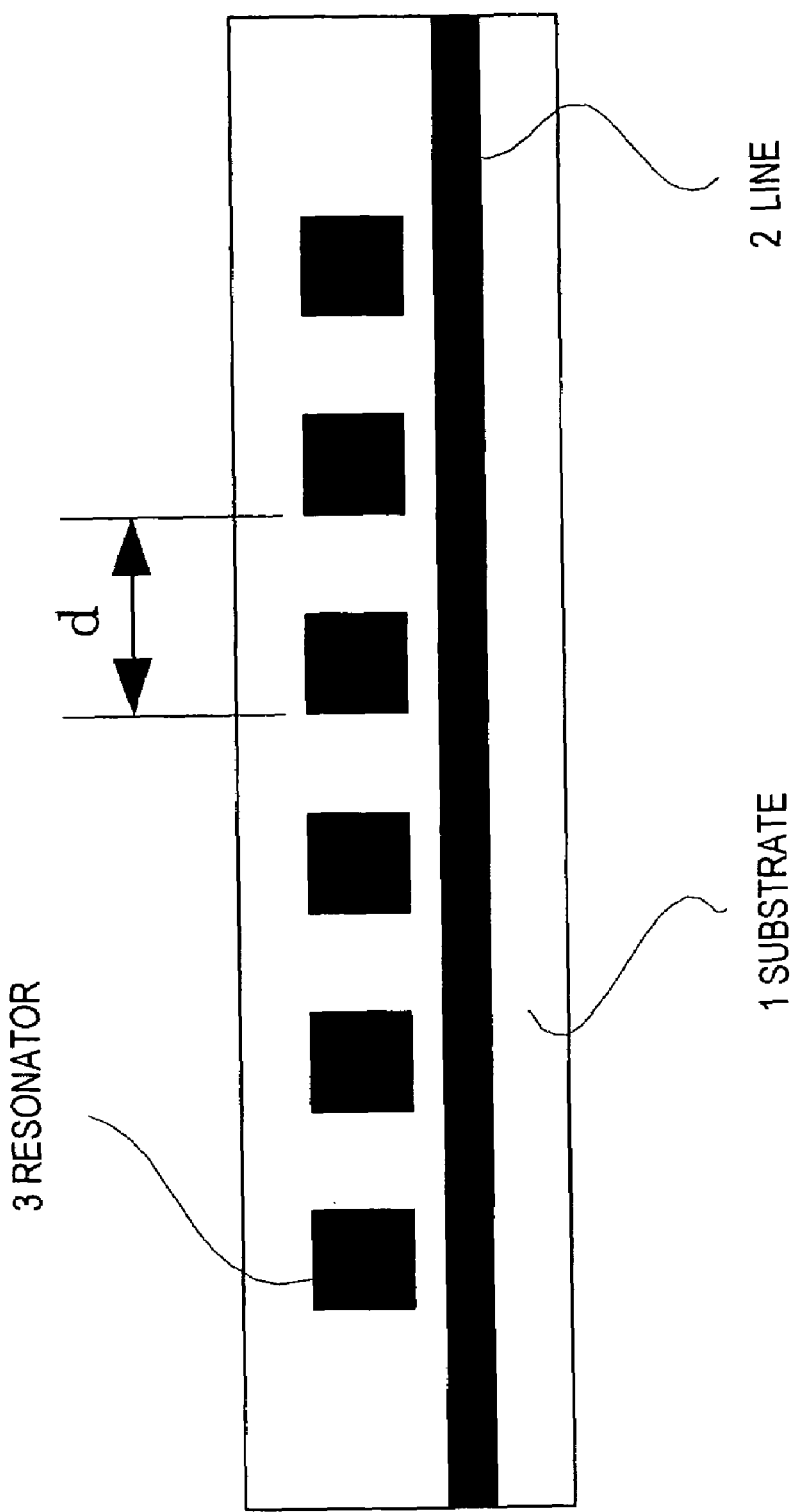
FIG. 1 is a plan view illustrating a schematic arrangement for a demultiplexer according to the present invention.

Referring to FIG. 1, illustrated is a demultiplexer according to the present invention, which receives a multiplexed signal, in which a plurality of electrical signals with mutually different frequencies are multiplexed together, and which divides the multiplexed signal into the electrical signals. As shown in FIG. 1, this demultiplexer includes a substrate 1, a line 2 provided on the substrate 1 for transmitting the multiplexed signal, and a plurality of resonators 3 arranged along the line 2 on the substrate 1.

In the demultiplexer of the present invention, the dispersion characteristic (i.e., the relationship between the frequency and the wave number) of the line 2 has a nonlinear portion (i.e., a range in which the frequency is not proportional to the wave number), caused by electromagnetic coupling between the line 2 and the resonators 3. Accordingly, the phase velocities of the electrical signals propagating through the line 2 change according to their frequencies.

Hereinafter, this point will be described more fully with reference to the accompanying drawings.

Figure 2:
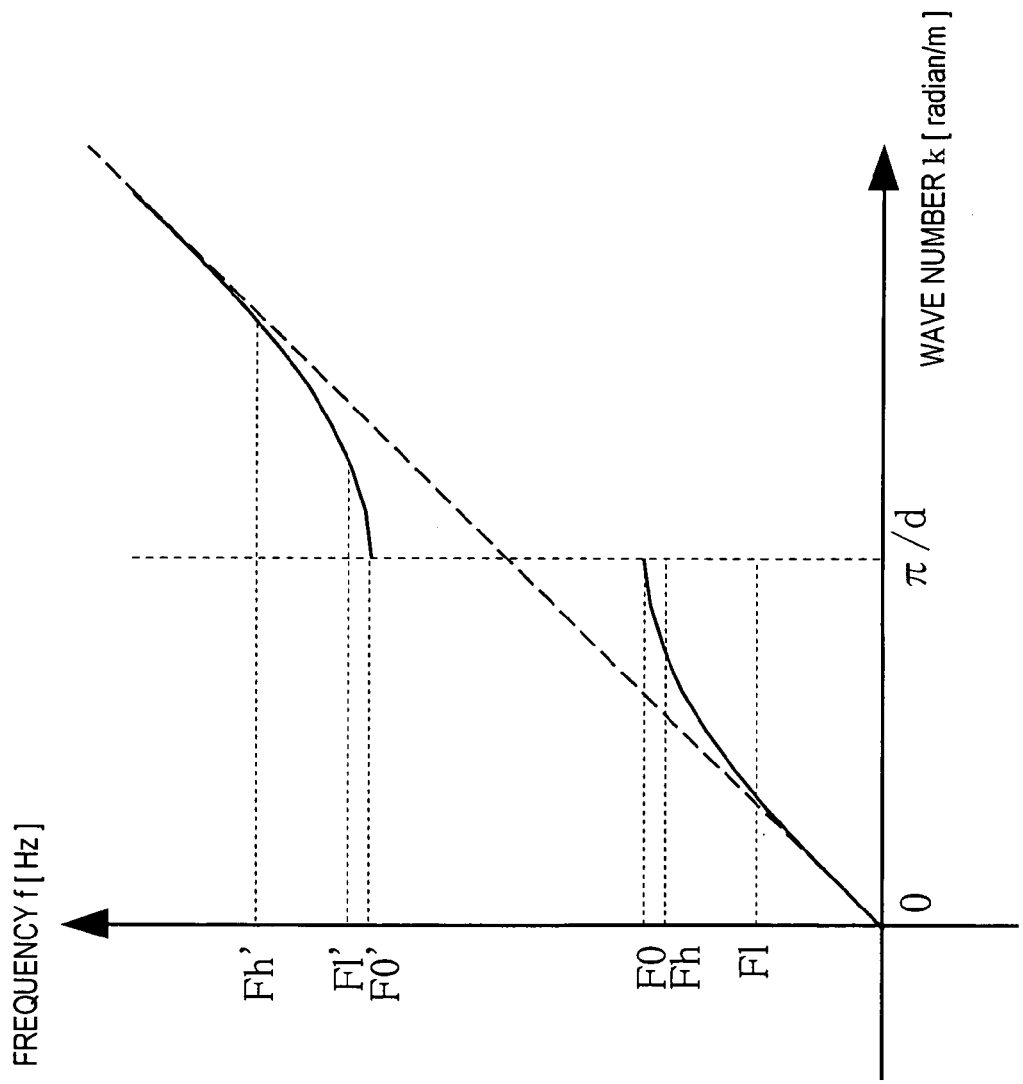
FIG. 2 is a graph showing a relationship between the wave number k and frequency f of an RF signal which propagates through the line in the demultiplexer of the present invention.

First, looking at FIG. 2, drawn is a graph showing a relationship between the frequency f and wave number k (i.e., the dispersion characteristic) of an RF signal propagating through the line 2 (e.g., a sinusoidal wave with a frequency of 1 GHz or more). In the graph shown in FIG. 2, the abscissa represents the wave number k of the signal while the ordinate represents the frequency f thereof. When the wavelength of the signal on the line 2 is represented by $\lambda$, this wave number k is equal to $2\pi/\lambda$.

Suppose how the relationship between the wave number k and the frequency f will be if no resonators 3 are arranged on the substrate 1, i.e., in a normal microstrip line, as a comparative example. In that case, the dispersion characteristic resulting from the line structure of the microstrip line will have almost no singularity. That is why unless the dielectric constant of the substrate 1 has frequency dependence, a substantially linear dispersion characteristic is realized as plotted by the dashed line in FIG. 2.

The phase velocity of a sine wave signal which propagates through the line 2 is equal to the gradient of the dispersion curve shown in FIG. 2. Accordingly, if no resonators are provided, the phase velocity of any RF which propagates through the microstrip line will be a constant V0, which does not depend on the frequency. As a result, a number of RF signals with different frequencies propagate through the line 2 of the same length in the same amount of time, which will be referred to herein as a "time delay".

Meanwhile, in the demultiplexer of the present invention in which the resonators 3 are arranged on the substrate 1, a sine wave signal which propagates through the line 2 is subject to disturbance due to the electromagnetic coupling between the line 2 and the resonators 3. Consequently, a portion of the signal which propagates through the line 2 travels backward along the line 2.

If a plurality of resonators 3 are arranged along the line 2 as shown in FIG. 1 and if the propagation wavelength $\lambda$ of the signal is twice as long as the interval d of the resonators 3 (i.e., if $\lambda=2d$), then respective scattered waves generated by the resonators 3 will be in phase with each other, enhance each other, and interfere with the incoming wave, thereby producing a standing wave. As a result, a sine wave signal, of which the propagation wavelength $\lambda$ is equal to 2d, cannot propagate through the line 2 anymore.

In FIG. 2, the solid curves represent the dispersion characteristic of the line 2 in the demultiplexer shown in FIG. 1. This dispersion characteristic consists of two curves, of which the asymptote is the dashed line. As can be seen from the graph shown in FIG. 2, the RF signal cannot propagate through the line 2 in the frequency range of F0 through F0'. In this sense, the frequency range of F0 through F0' is equivalent to the bandgap of a solid.

In the demultiplexer of the present invention, the greater the difference between the propagation wavelength $\lambda$ on the line 2 and the interval 2d, the smaller the degree of mutual enhancement of the scattered waves and the magnitude of resonance produced by the resonators 3. For that reason, as the difference between the propagation wavelength $\lambda$ and the interval 2d increases, the solid curves shown in FIG. 2 more and more approach the dashed asymptote. On the other hand, as the propagation wavelength $\lambda$ gets closer to the interval 2d, the phase velocity of the signal which propagates through the line more and more approaches zero (i.e., closer to a standing wave). And when the propagation wavelength $\lambda$ gets equal to 2d, the wave number k is given by $\pi/d$. To get the phase velocity of a signal equal to zero means that the gradient of the solid dispersion curves becomes zero when $k=\pi/d$.

Figure 3:
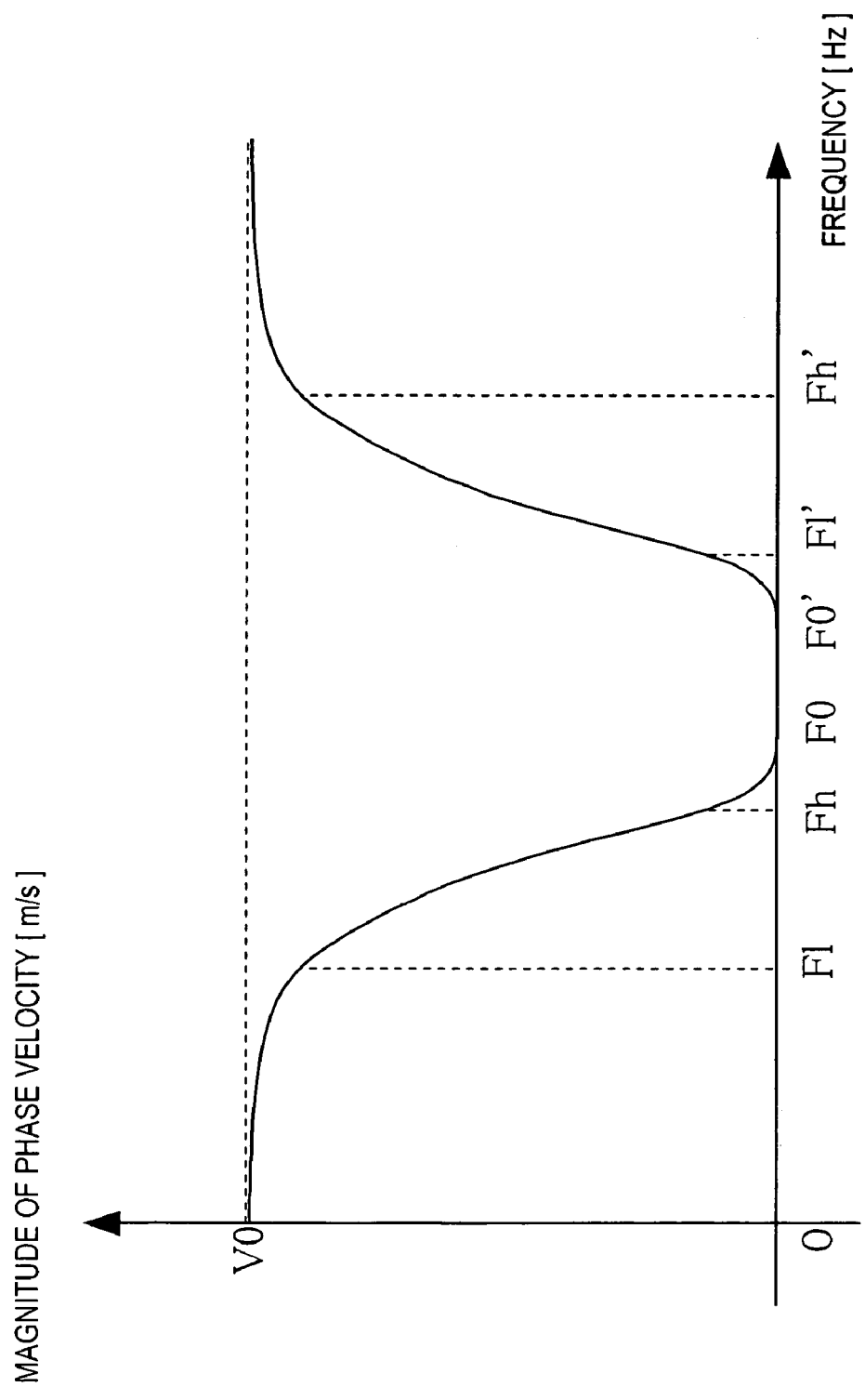
FIG. 3 is a graph showing how the phase velocity of a sine wave propagating through the line in the demultiplexer of the present invention changes with the frequency.

In FIG. 2, in a wave number region in which the solid dispersion characteristic curve significantly deviates from the dashed line (i.e., in a singularity region), the phase velocity of the signal changes significantly with the wave number of the sine wave signal propagating through a line without dispersion. FIG. 3 is a graph showing a relationship between the frequency and the phase velocity in that singularity region. In FIG. 3, the frequencies Fl to Fh are associated with a plurality of wave numbers falling within the singularity region shown in FIG. 2.

As can be seen from FIG. 3, as the frequency changes, the phase velocity of the signal which propagates through the line 2 varies from 0 through V0. The phase velocity changes particularly significantly in the frequency range of Fl through Fh and the frequency range of Fl' through Fh'. For example, in the frequency range of Fl through Fh, the time delay $\tau$ of the sine wave which propagates through the line 2 depends on its frequency f. The same is true of the other frequency range of Fl' through Fh'. Since the time delay $\tau$ is a function of the frequency f, $\tau=\tau(f)$.

Since the arrangement of the resonators has translational symmetry, the singularity point of the dispersion is defined at $k'=k+n\pi/d$ (where n is an integer). In the demultiplexer of the present invention, if the RF signal has a predetermined frequency range, the interval between the resonators needs to be increased to apply a high-order mode in which n is more than 1. However, this is not beneficial because the resultant demultiplexer will have an increased size.

Next, it will be described with reference to FIGS. 4 and 5 how the demultiplexer of the present invention operates in response to incoming pulsed signals.

Figure 4:
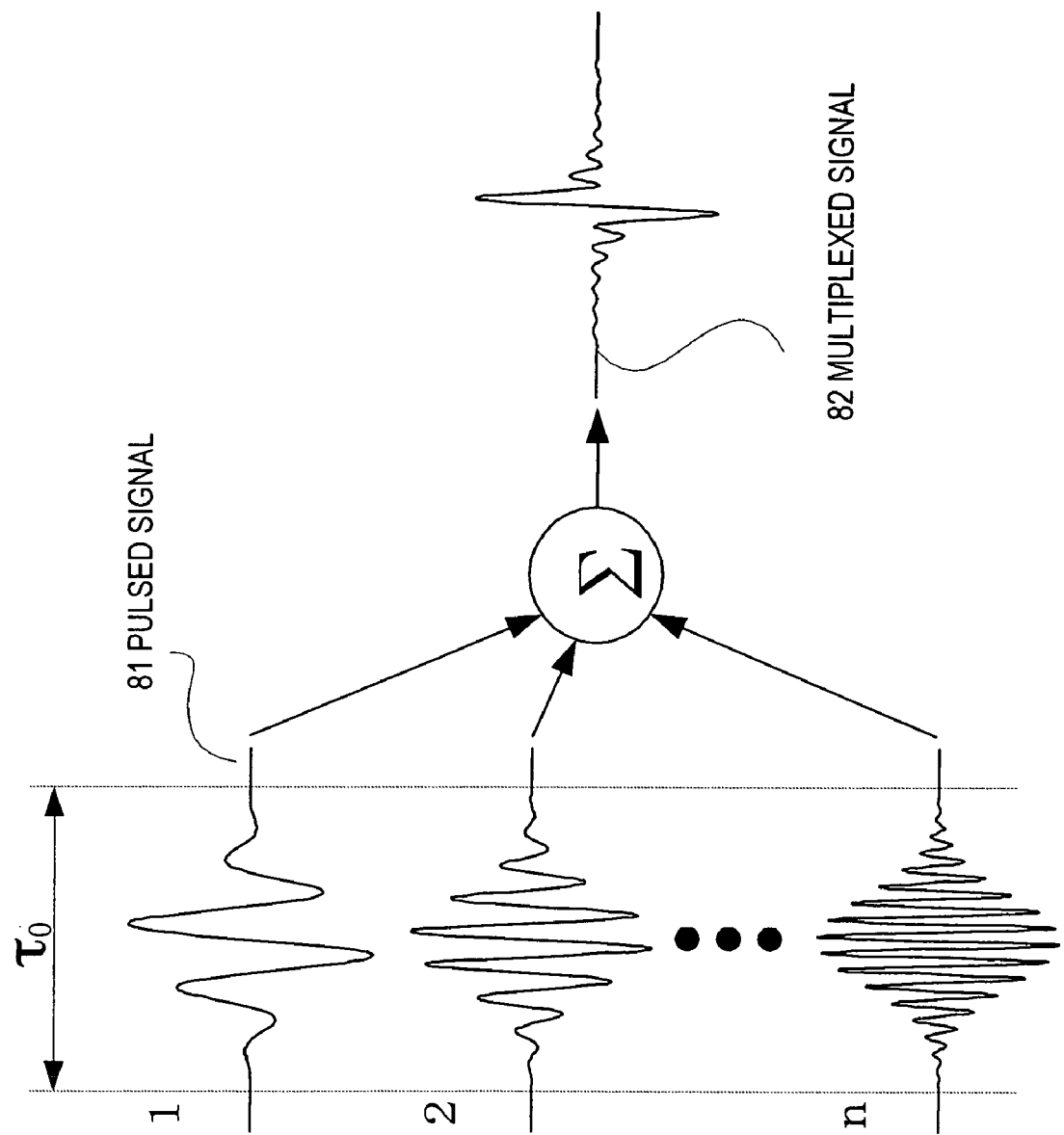
FIG. 4 shows how to multiplex pulsed signals with carriers having mutually different frequencies.
Figure 5:
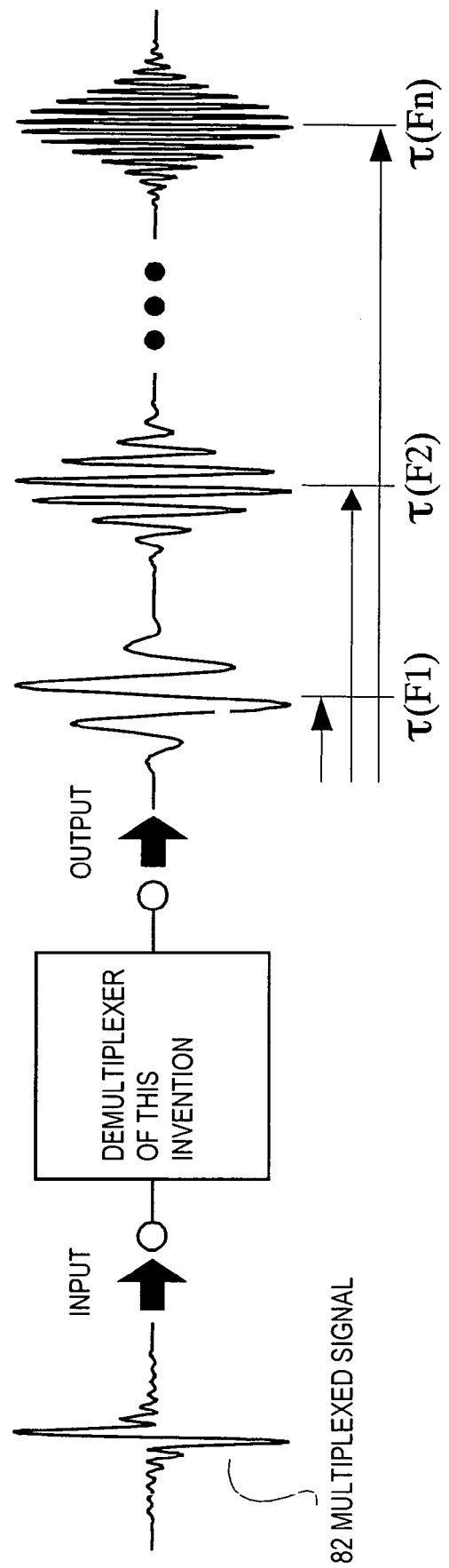
FIG. 5 shows how the signal waveform of a multiplexed signal changes after the multiplexed signal has been input to the demultiplexer of the present invention.

FIG. 4 shows how a number n of pulsed signals 81 are multiplexed together. Each pulsed signal 81 has been generated as the product of a sine wave with a frequency Fi (where i=1, 2, . . . , or n) and a pulse signal with a Gaussian waveform having a pulse length $\tau 0$. Accordingly, each pulsed signal 81 is a wave packet that oscillates in the period of the sine wave signal and that has a pulse length of $\tau 0$.

These pulsed signals 81 are superposed one upon the other such that their pulses overlap with each other, thereby generating a multiplexed signal 82. The pulsed signals 81 have mutually different carrier frequencies. For that reason, in the multiplexed signal 82, the respective pulsed signals 81 yet to be superposed are present without interfering with each other. Accordingly, if one bit of a signal to transmit is represented by the presence or absence of the pulsed signal 81, then the multiplexed signal 82 can contain n-bit information in a single pulse.

If the multiplexed signal 82 generated in this manner is input to the demultiplexer of the present invention, the time it takes for each pulsed signal 81 to pass the line 2 (i.e., its time delay) changes with its carrier frequency. As a result, the multiplexed signal 82 can be split into the respective pulsed signals 81 on the time base as shown in FIG. 5. These carrier frequencies F1 through Fn are supposed to be included in the frequency range in which the dispersion characteristic exhibits the singularity described above and to satisfy the relationship $F1 \leq Fi \leq Fh$. In that case, each of the pulsed signals 81 included in the multiplexed signal 82 will have a different time delay $\tau(Fi)$, which changes according to its carrier frequency Fi. Accordingly, $|\tau(Fi)-\tau(Fj)|$ (where $i \neq j$) is greater than the pulse length $\tau 0$, the respective output pulses of the demultiplexer will never overlap with each other on the time base. Consequently, the signals that have been multiplexed together can be output independently of each other (i.e., the multiplexed signal can be demultiplexed) as shown in FIG. 5. It should be noted that such demultiplexing corresponds to demodulating the data of the multiplexed signal 82.

Figure 6:
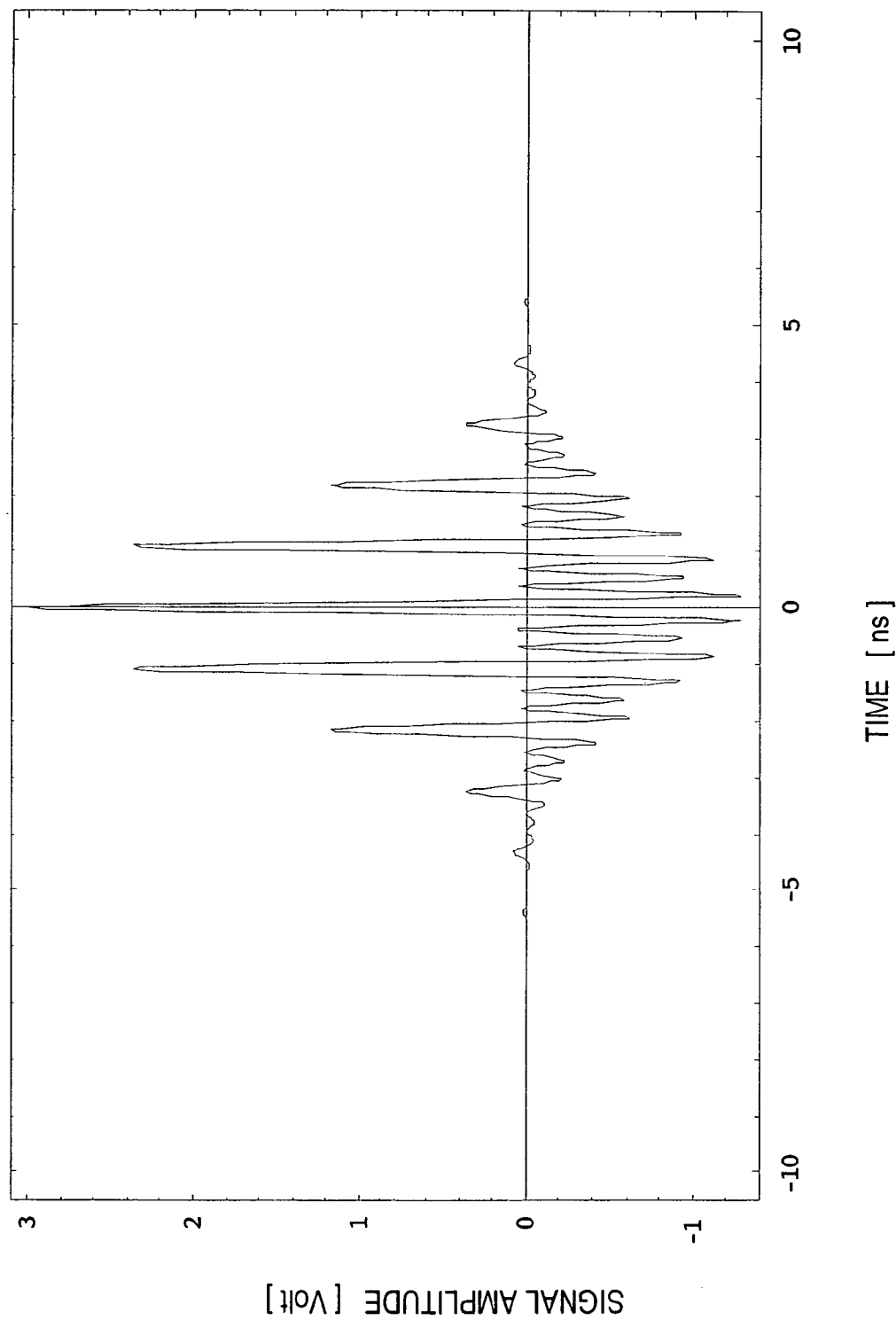
FIG. 6 shows the waveform of an input signal obtained by superposing three pulse signals one upon the other.

FIG. 6 shows a multiplexed signal obtained by multiplexing together three pulsed signals, each having a pulse width of 10 ns. These the pulsed signals have carrier frequencies of 0.92 GHz, 1.85 GHz and 2.77 GHz, respectively.

Figure 7:
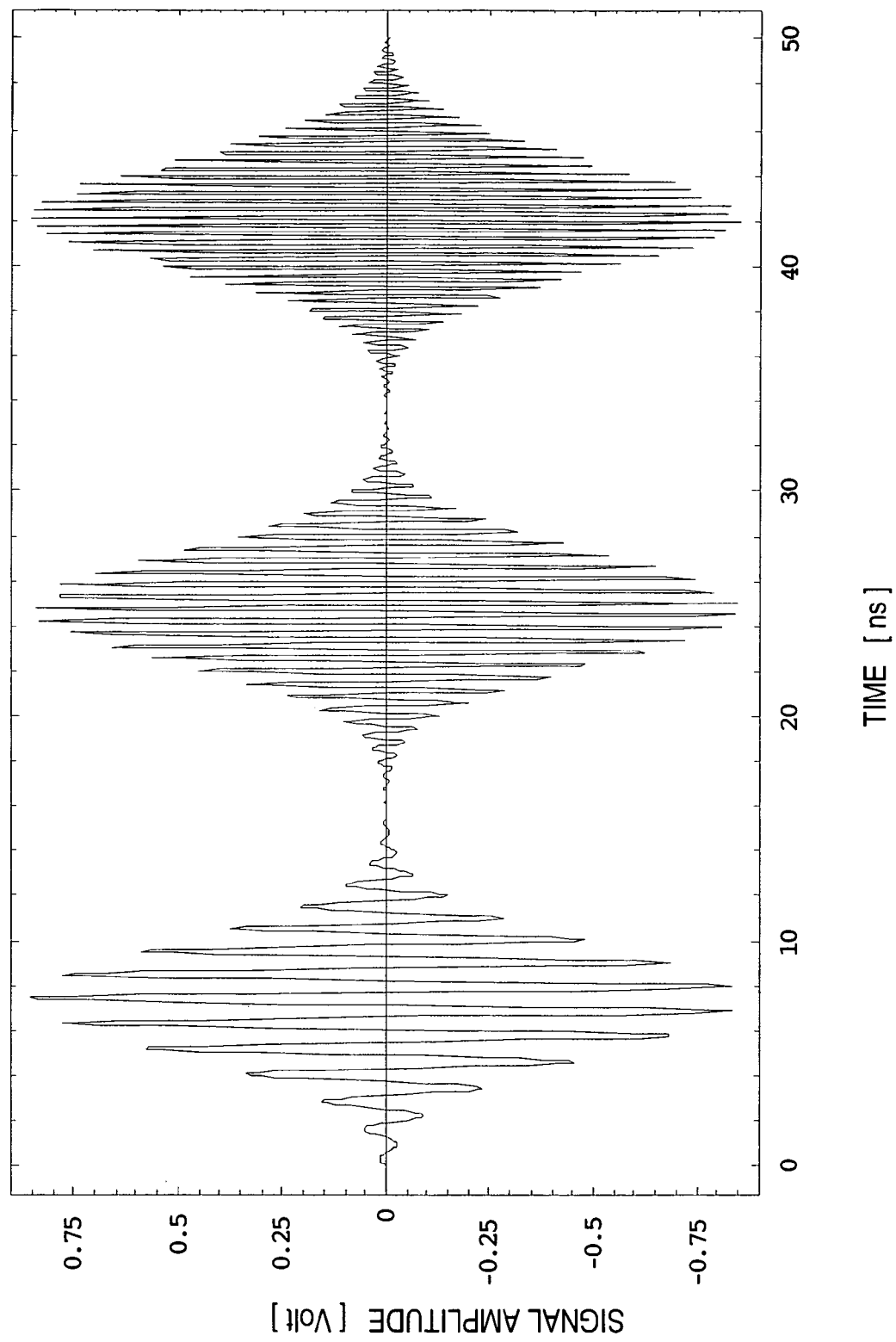
FIG. 7 shows the waveforms of output signals obtained by inputting the pulse signal shown in FIG. 6 to the demultiplexer of the present invention.

FIG. 7 shows the respective waveforms of three pulsed signals obtained by getting the multiplexed signal divided by the demultiplexer of the present invention. The present inventors carried out a computer simulation on the supposition that the line of the demultiplexer had a delay characteristic represented by the following equation:

$$\tau(F) = \exp(-0.038 i \cdot F^2)$$

where i is an imaginary unit, i.e., $(-1)^{1/2}$. The waveforms shown in FIG. 7 were obtained as a result of this simulation.

As can be seen from FIG. 7, the three pulsed signals that have been superposed one upon the other have been broken into independent pulsed signals that do not overlap with each other on the time base.

As described above, if the resonators 3 and the line 2 are designed so as to achieve the required delay characteristic $\tau$ (F), then the signal shown in FIG. 6 can be demultiplexed on the time base as shown in FIG. 7. It should be noted that the carrier frequencies Fi may also satisfy Fl'≦Fi≦Fh'.

The demultiplexer of the present invention has a reversible configuration. Accordingly, if the pulsed signals shown on the right hand side of FIG. 5 are input to the demultiplexer at appropriate timings, the demultiplexer may generate the multiplexed signal 82. That is to say, the demultiplexer of the present invention can also function as a multiplexer. In other words, the present invention is broadly applicable for use in demultiplexers, multiplexers and demultiplexers/multiplexers.

In general, the characteristic of a power coupler has strong frequency dependence. Accordingly, it is difficult for such a power coupler to process a signal having broad frequency components such as a pulse signal. However, the multiplexer of the present invention can multiplex those pulsed signals together.

Hereinafter, the configuration of the demultiplexer of the present invention will be described in further detail with reference to FIG. 1 again.

The substrate 1 for use in the present invention is preferably a parallel plate made of a dielectric material, which has low dielectric loss in a desired frequency range (e.g., a fluorine resin or alumina ceramic). By reducing the dielectric loss, decrease in power due to transmission loss and deterioration in the characteristic of a communication device can be minimized.

The substrate 1 is made of a generally available dielectric material such as alumina ceramic. An alumina ceramic on the market has an in-plane thickness variation of at most several μm/mm and an average surface roughness (Ra) of 0.1 μm or less. Also, the dielectric constant and dielectric loss tangent of the alumina ceramic are about 10 and about 0.001, respectively, in the 25 GHz band. Such an alumina ceramic is preferably used as a material for the substrate 1 of the present invention.

The substrate 1 made of such an alumina ceramic has very small in-plane variations in thickness and dielectric constant. Accordingly, in discussing electrical characteristics in a desired frequency range, that substrate can be treated as an RF substrate with substantially uniform thickness and dielectric constant.

The line 2 can be defined on the upper surface of the substrate 1 by providing a conductor layer on the upper surface of the substrate 1 and then patterning the conductor layer. The conductor layer may be formed by a rolling, electroforming or thin film deposition technique. Examples of preferred thin film deposition techniques include physical thin film deposition techniques such as an evaporation process and chemical thin film deposition techniques such as a CVD. The thickness of this conductor layer is set at least equal to the skin depth of the RF signal propagating through the line 2 in its frequency range.

Suppose copper with a conductivity of $5.6 \times 10^7$ Sie/m is used as the material of the line 2. In that case, copper has a skin depth of 0.43 μm at a frequency of 25 GHz. Accordingly, the copper layer to deposit preferably has a thickness of at least 0.43 μm.

In a preferred embodiment, foil of a conductor is bonded onto the upper surface of the substrate 1 and then patterned, thereby forming the line 2. On the lower surface of the substrate 1, another conductor foil is bonded so as to cover that surface entirely and function as an electrically grounded conductive layer (not shown). A microstrip line according to this preferred embodiment is completed in this manner.

The line 2 shown in FIG. 1 is a linear one and has the same line width. The line width of the line 2 is determined such that the microstrip line has a desired characteristic impedance. A circuit component for use in a normal RF circuit has an input/output impedance of 50 Ω. Accordingly, to realize impedance matching, the characteristic impedance of such a microstrip line is also preferably set to 50 Ω. If the substrate 1 is made of alumina ceramic with a thickness of 127 μm, a characteristic impedance of about 50 Ω is realized at a frequency of 25 GHz by setting the line width at 127 μm.

The resonators 3 are preferably low-loss resonators that produce resonances in a broad frequency range. The distance from the resonators 3 to the line 2 is determined such that a sufficient degree of electromagnetic coupling is produced between the RF signal propagating through the line 2 and the resonators 3. The closer to the resonant frequency of the resonators 3 the frequency of the RF signal is, the greater the electromagnetic coupling between the RF signal and the line 2.

The characteristic impedance of the line 2 changes with the magnitude of the electromagnetic coupling. The distance from the line 2 to the resonators 3 is determined such that the characteristic impedance of the line 2 is not significantly shifted by the resonators 3 from 50 Ω within the frequency range of the RF signal propagating through the line 2. To avoid the deterioration of characteristic due to impedance mismatch, the standing wave ratio at each site on the substrate 1 is preferably 1.5 or less. For that purpose, the characteristic impedance of the line 2 preferably falls within the range of 33 Ω to 75 Ω. That is why the distance from the line 2 to the resonators 3 is defined such that the characteristic impedance of the line 2 falls within the range of 33 Ω to 75 Ω.

In the demultiplexer shown in FIG. 1, every resonator 3 has the same configuration, and the distance from the line 2 to the resonators 3 is maintained substantially constant. Consequently, electrical interactions, produced between the RF signal propagating through the line 2 and the resonators 3, are substantially the same for every resonator.

Also, the same interval d is provided between each pair of adjacent resonators 3. Suppose the RF signal propagating through the line 2 is a sine wave, the frequency of the RF signal is equal to the resonant frequency of the resonators 3 and the propagation wavelength is λ. In that case, d is preferably determined such that λ and d satisfies the equation:

$$d \approx \lambda/2$$

For examples if the demultiplexer has an operating frequency of 30 GHz and if the substrate 1 is made of a ceramic with a thickness of 127 μm, then the propagation wavelength λ on the line 2 will be about 3.8 mm and d is set to 1.9 mm.

Naturally, the resonators 3 are arranged so as to produce electromagnetic coupling with respect to the RF signal propagating through the line 2. Any number of resonators 3 may be provided as long as there are at least two resonators 3.

Hereinafter, an exemplary multiplexer according to the present invention will be described with reference to FIG. 8.

Figure 8:
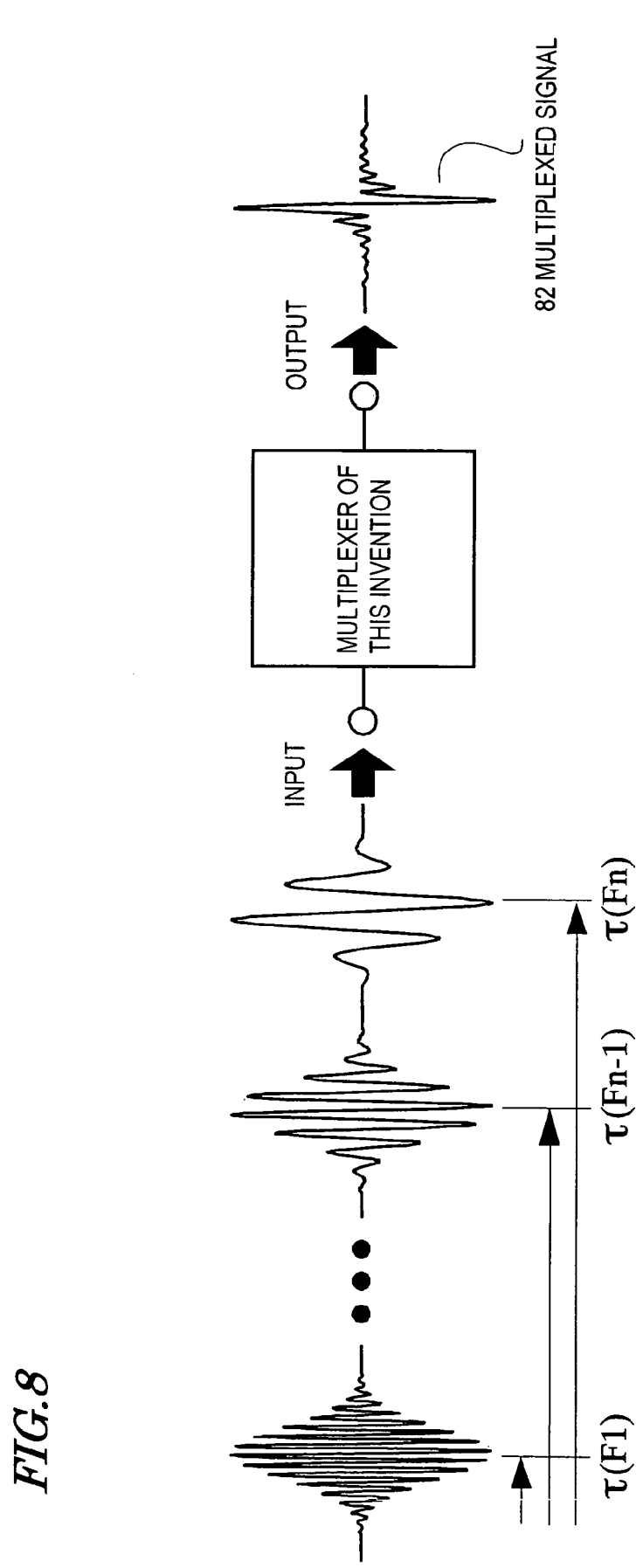
FIG. 8 shows how the signal waveforms of a plurality of pulse signals change by inputting the pulse signals to the multiplexer of the present invention.

The multiplexer shown in FIG. 8 has basically the same configuration as the demultiplexer described above. Thus, the description of its internal configuration will be omitted herein and its multiplexing operation will be described instead.

As shown in FIG. 8, when a number of pulsed signals are input to the multiplexer of the present invention, the time it takes for each pulsed signal to pass the line of the multiplexer (i.e., the time delay) changes according to its carrier frequency, and therefore, a multiplexed signal 82 can be generated by superposing the respective pulsed signals on the time base.

The carrier frequencies F1 through Fn of the respective pulsed signals to be input to the multiplexer are supposed to be included in the frequency range in which the dispersion characteristic exhibits the singularity described above and to satisfy the relationship F1≦Fi≦Fh. More specifically, suppose a situation where the higher the frequency (in the order of F1, . . . , Fn−1 and Fn), the lower the phase velocity as shown in the graph of FIG. 3. In that case, each of the pulsed signals propagating through the line of the multiplexer will cause a different time delay τ(Fi), which changes according to its carrier frequency Fi. The earlier the time a given pulsed signal was input to the multiplexer, the longer its time delay τ(Fi). Thus, by adjusting their time delays τ(Fi) and input timings, the output timings of the respective pulsed signal can be matched each other.

In the output multiplexed signal 82 of the multiplexer, the respective pulsed signals yet to be superposed are present without interfering with each other. Accordingly, if one bit of a signal to transmit is represented by the presence or absence of the pulsed signal, then the multiplexed signal 82 can contain n-bit information in a single pulse. Such a multiplexed signal 82 can be easily demultiplexed by the demultiplexer of the present invention and the original pulsed signals can be easily obtained as shown in FIG. 5.

Hereinafter, specific preferred embodiments of the demultiplexer of the present invention will be described with reference to the accompanying drawings. It should be noted that the configurations to be described below are applicable as they are to multiplexers or demultiplexers/multiplexers.

Embodiment 1

Hereinafter, a first specific preferred embodiment of the demultiplexer of the present invention will be described with reference to FIG. 9.

The basic configuration of the demultiplexer of this preferred embodiment is the same as that of the demultiplexer shown in FIG. 1. This preferred embodiment is characterized by including a dual-mode resonator as shown in FIG. 9. This resonator 3 is a circular conductor pattern with a notch 21 (which will be referred to herein as a "circular patch") as shown in FIG. 9. Only one resonator 3 is illustrated in FIG. 9. Actually, however, a number of resonators 3 are arranged periodically on the substrate 1. The same statement will apply to each of the examples shown in FIGS. 10 through 16.

The radius r (mm) of the circular patch is given by $$r = 8.78 \times 10^{10}/(fr \times er^{1/2})$$

where fr denotes the resonant frequency (Hz) and er denotes the relative dielectric constant of the substrate 1.

The distribution of an electromagnetic field, which is generated in the circular patch at the lowest-order resonant frequency, is called a "resonant mode". A circular patch with no notches 21 has two linearly independent resonant modes at a single resonant frequency. Thus, these resonant modes are twofold degenerate. This degeneracy is caused by the rotation symmetry of the circular patch. Accordingly, if this symmetry is collapsed by providing the notch 21 shown in FIG. 9, the degeneracy can also be resolved.

Supposing the resonant frequency of the circular patch with no notches 21 is H, the resonant frequency is split into H+δH and H−δH (where δH>0) by providing the notch 21. That is to say, when the notch 21 is provided, the resonator produces resonances at two different frequencies. Also, the electromagnetic fields generated by these resonances (i.e., resonant modes) are mutually independent basic modes. If the circular patch with no notches has a band ΔH, that band can be expanded to almost ΔH+2δH through this degeneracy splitting. It should be noted that the magnitude of δH can be approximated as the ratio of the area of the notch 21 to that of the circular patch.

Figure 9:
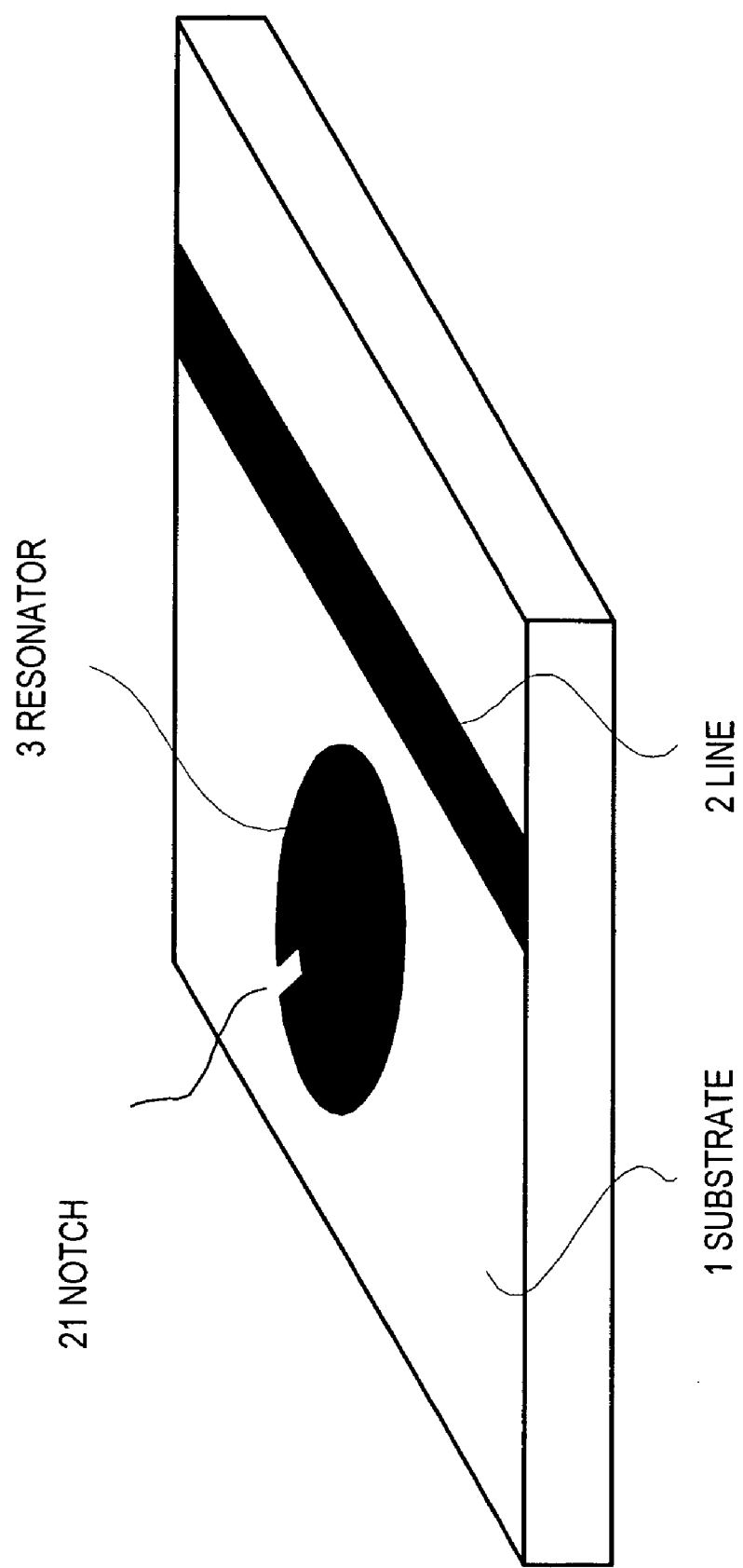
FIG. 9 is a perspective view illustrating the schematic structure of a dual-mode resonator that uses a circular conductor.

The resonator 3 shown in FIG. 9 is called a "dual-mode resonator". Such a degenerate mode splitting resonator may also be implemented as a square conductor pattern or a circular or square ring conductor pattern, not just the circular patch.

The value obtained by dividing the propagation wavelength in vacuum at a desired resonant frequency by the ½ power of the relative dielectric constant of the substrate 1 is an effective propagation wavelength λ'. When this λ' is used, each side of the square conductor pattern preferably has a length of ½λ'. As for the circular or square ring conductor pattern, the closed centerline of that conductor preferably has a length of about 1λ'.

The notch 21 may have any arbitrary shape as long as the notch 21 collapses the geometric symmetry of each patch. Optionally, the notch 21 may be replaced with a conductor pattern such as a stub to add to the patch. As can be seen, the shape feature portion (such as the notch or the additional conductor portion) provided to resolve the degeneracy may have any arbitrary pattern. However, its area should be sufficiently smaller than that of the patch. Even when the circular or square ring conductor pattern is used, a stub may also be added to the conductor pattern or the line width thereof may be locally changed with a portion of the conductor pattern.

The structure of such a resonator including a pattern of a highly symmetrical shape and a pattern that collapses the symmetry is not limited to these ones. Even when either an elliptical patch or ring with low oblateness or a rectangular patch or ring, of which the longer and shorter sides are not so much different in length, is used, a degenerate mode splitting resonator can also be obtained.

Embodiment 2

Hereinafter, a second specific preferred embodiment of the demultiplexer of the present invention will be described with reference to FIG. 10.

The demultiplexer of this preferred embodiment has almost the same configuration as the counterpart of the first preferred embodiment described above. The only difference lies in the structure of the resonator 3. FIG. 10 illustrates the structure of the resonator 3 adopted in this preferred embodiment. This resonator 3 includes an arrangement of line resonator elements 31. These line resonator elements 31 have almost the same lowest-order resonant frequency. It should be noted that the respective shapes of these line resonator elements 31 do not have to be quite identical with each other but may be different from each other as long as those elements 31 have almost the same resonant frequency.

Next, it will be described how the resonator 3 shown in FIG. 10 operates.

In general, a parallel coupled line, consisting of two straight lines, has two propagation modes—even mode and odd mode. The propagation wavelength of the even mode is different from that of the odd mode. Accordingly, a resonator, made up of two straight lines of the same shape, will have two resonant frequencies. The same statement also applies to a situation where a resonator is made up of a number n of straight lines. Specifically, if a resonator is comprised of a number n of straight lines, each having a length that is equal to ½ wavelength, then the same number n of waveguide modes will be produced and the resonator will have at most n resonant frequencies overall. Thus, the resonator 3 shown in FIG. 10 can expand the resonant frequency range without causing loss.

Figure 10:
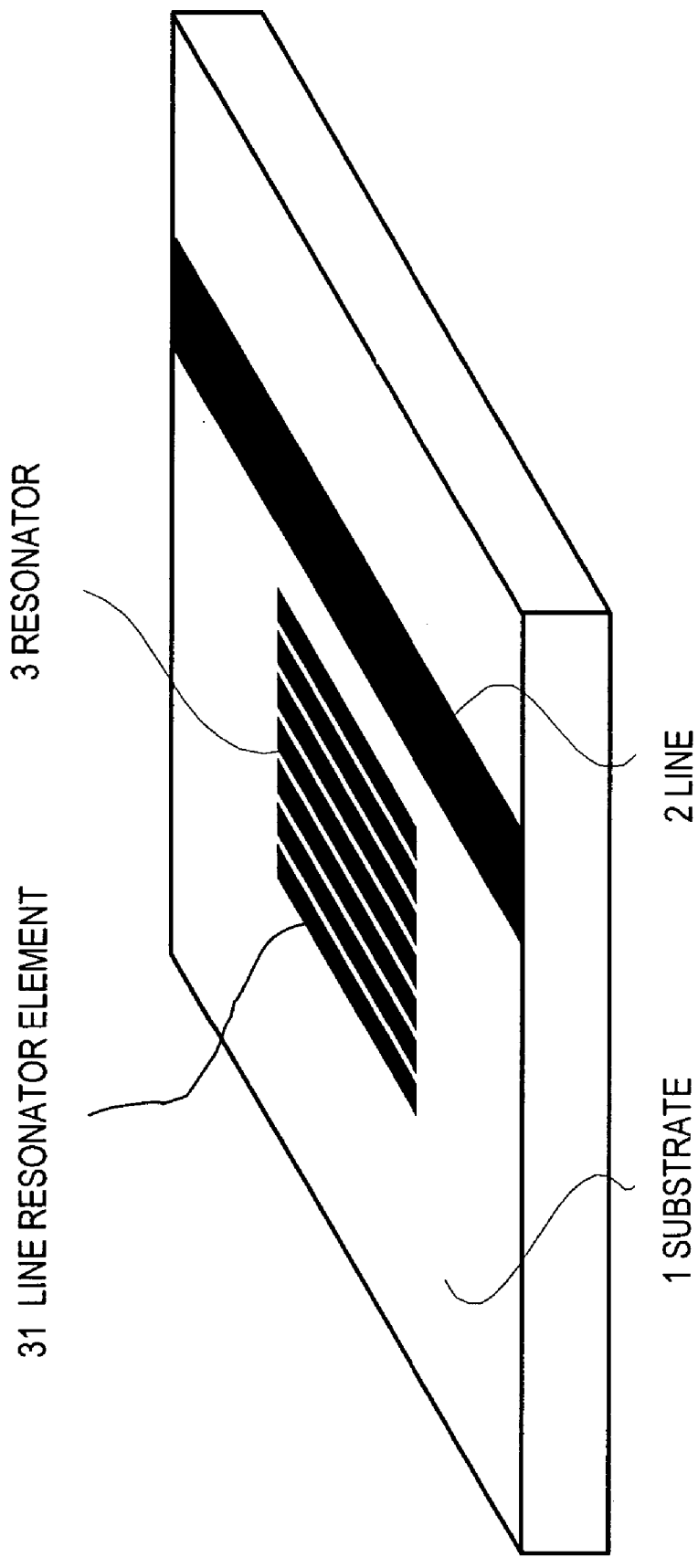
FIG. 10 is a perspective view illustrating the schematic structure of a resonator including a plurality of parasitic elements.
Figure 11:
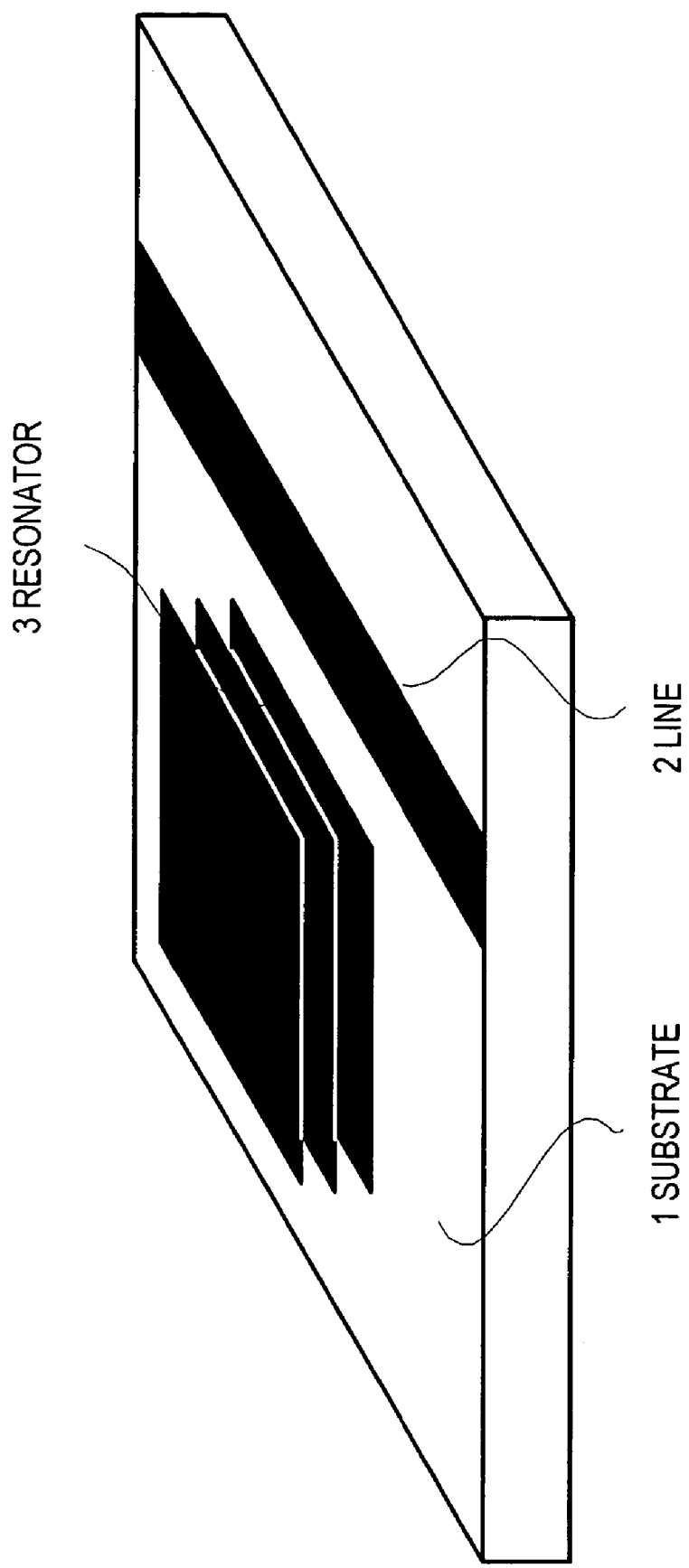
FIG. 11 is a perspective view illustrating the schematic structure of a resonator that produces resonances at multiple frequencies by stacking a number of square resonators one upon the other.

Alternatively, the resonator 3 shown in FIG. 10 may be replaced with the resonator 3 shown in FIG. 11. Specifically, the resonator 3 shown in FIG. 11 includes a stack of patches having almost the same resonant frequency. The gap between each pair of patches stacked may be either filled with a dielectric or just left as an air layer. This resonator 3 also operates in the same way as the resonator shown in FIG. 10.

The operation of the resonator shown in FIG. 10 or 11 is similar to that of coupled pendulums, formed by coupling a number of dynamic pendulums, having substantially the same structures, with springs. Even if the respective pendulums that form the coupled pendulums have the same resonant frequency, the coupled pendulums will have the same number of split resonant frequencies as that of the pendulums.

To expand the resonant frequency range without increasing the loss caused by the resonator 3 in this manner, it is effective to make the resonator 3 exhibit multi-resonance characteristic.

Embodiment 3

In each of the preferred embodiments of the present invention described above, electromagnetic coupling is produced between the RF signal which propagates through the line 2 and the respective resonators, but the resonators themselves are independent of each other.

However, the demultiplexer of the present invention is in no way limited to such an arrangement. Alternatively, the resonators 3 arranged along the line 2 may be coupled together. With such coupling adopted, those resonators 3 arranged along the line may be regarded as forming one big resonator system. And the effects of the present invention are also achieved through the interactions between such a resonator system and the line 2.

The most important characteristic that the resonators for use in the present invention need to exhibit is their broad resonant frequency range. In other words, the resonators should have a low unloaded Q value. The unloaded Q value is represented as the ratio of the electromagnetic energy that can be stored in the resonators to the electromagnetic energy that is lost from the resonators. It should be noted that the energy lost from the resonators depends on the total of conductor loss, dielectric loss and radiation loss.

It is generally believed contradictory in principle to reduce resonator's loss and expand the same resonator's resonant frequency range at the same time. In a resonator system in which a plurality of resonators are arranged at regular intervals, however, if the unloaded Q value of the overall system can be reduced, then the resonant frequency range of the resonator system can be expanded as in bandpass filters. That is to say, it is possible to expand the resonant frequency range of the resonator system while reducing the loss of the overall system. To achieve these purposes, it is effective to enhance the electromagnetic coupling between each pair of adjacent resonators. To do so, an arbitrarily selected pair of resonators may be coupled together among those resonators that are arranged along the line 2. In that case, the unloaded Q value of the coupled resonators can be much lower than that of any other single resonator.

Figure 12:
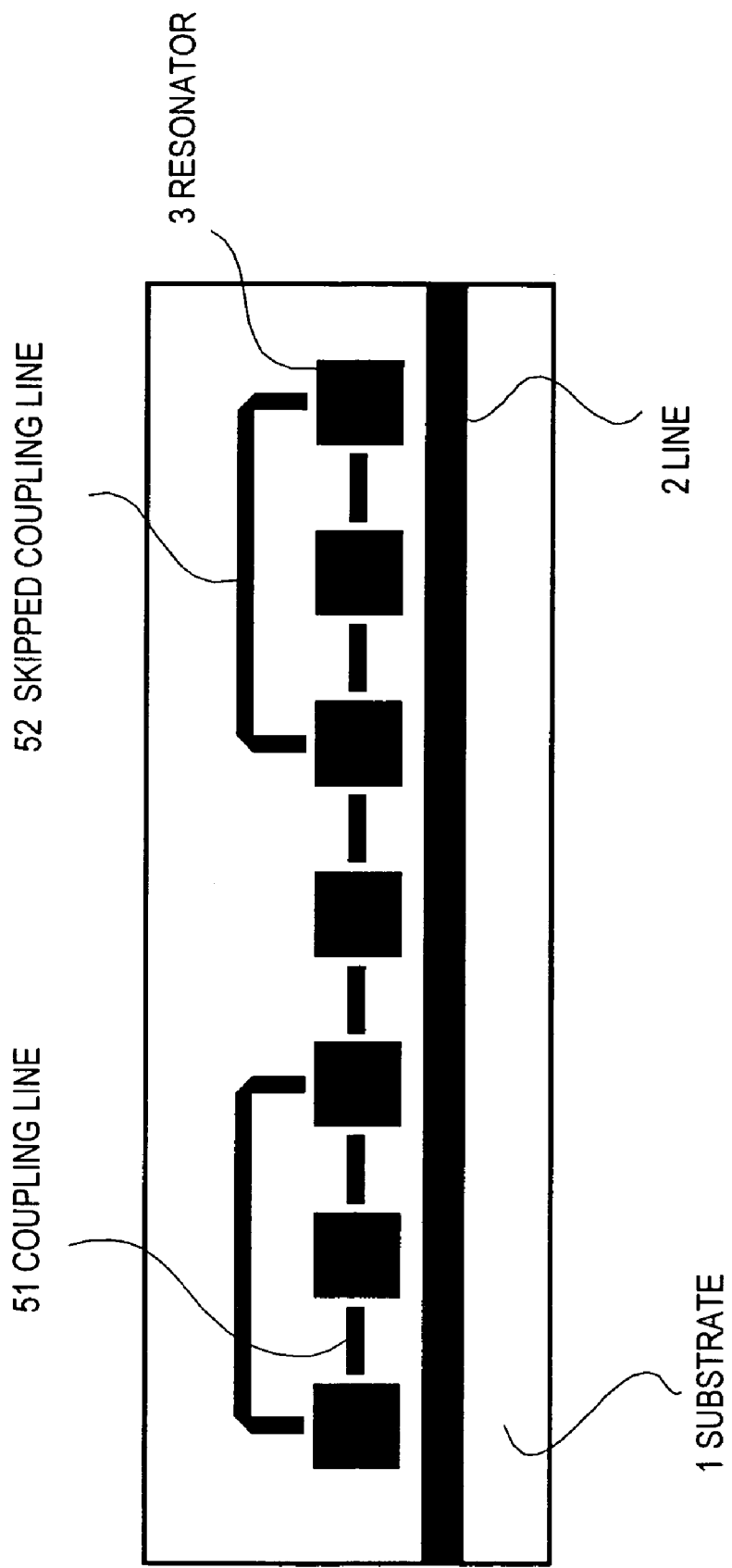
FIG. 12 is a plan view illustrating a preferred embodiment with a resonator system in which a number of resonators are coupled together with coupling lines.

FIG. 12 illustrates a demultiplexer according to this preferred embodiment including such a resonator system. In the resonator system of this demultiplexer, adjacent resonators are coupled together electromagnetically via a coupling line 51 and non-adjacent resonators 3 are also coupled together electromagnetically via a skipped coupling line 52, which is called "skipped coupling".

The coupling between the coupling line 51 or 52 and the resonators 3 may be electromagnetic coupling. Alternatively, the coupling line 51 or 52 and the resonators 3 may also be inductively connected together with no gaps left between them. In the example illustrated in FIG. 12, the coupling is done periodically using two skipped coupling lines 52. However, such periodicity is not always required.

Also, these resonators 3 are coupled together by two systems of circuits including the coupling line 51 and the skipped coupling line 52, respectively. Optionally, three or more systems may be formed by the skipped coupling lines. These coupling lines 51 and 52 may have either the same length or mutually different lengths.

If the respective resonators in the resonator system are coupled together strongly, then the unloaded Q value of the overall resonator system can be reduced. In addition, such a resonator system can produce resonances at even more frequencies. If the respective resonators 3 are used independently of each other, no resonances will be produced at any sites other than the resonators 3 themselves. In the example illustrated in FIG. 12, however, resonances are also produced on the coupling line 51 and skipped coupling line 52. Consequently, a resonator system, exhibiting a much varied resonance spectrum, is realized.

Other Embodiments

The line 2 in each of the preferred embodiments of the present invention described above is supposed to be a microstrip line. However, the line for use in the present invention is in no way limited to such a microstrip line. To achieve the effects of the present invention, the line to couple with the resonators has only to be a distributed line.

Hereinafter, examples of distributed lines that may be adopted in the present, invention will be described with reference to FIGS. 13 to 18.

Figure 13:
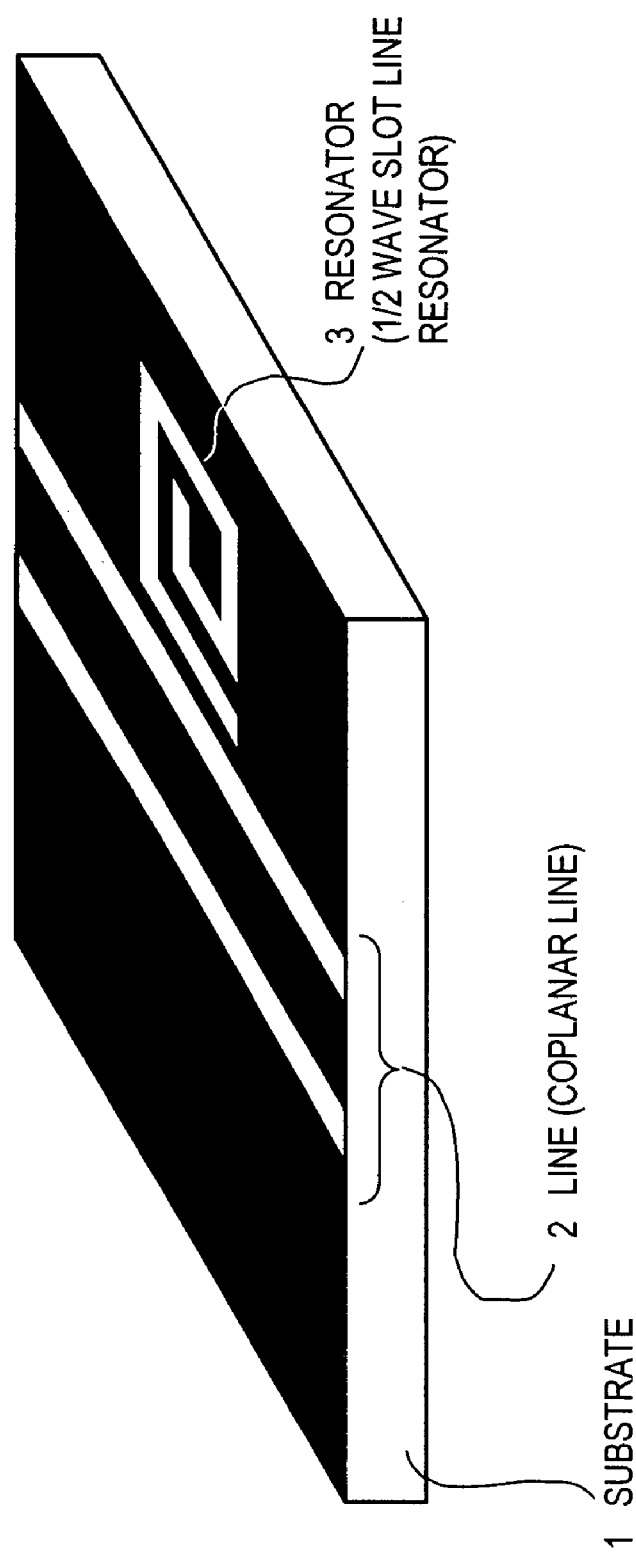
FIG. 13 is a perspective view illustrating a main portion of a demultiplexer including a coplanar line.

FIG. 13 illustrates a demultiplexer according to the present invention including a coplanar line. Straight line portions and two grounded layers, coupling with those straight line portions, are arranged on the same surface of the substrate 1. In this preferred embodiment, the resonator 3 is a ½ wave slot line resonator, which is defined by a slot pattern provided in the grounded layer.

Figure 14:
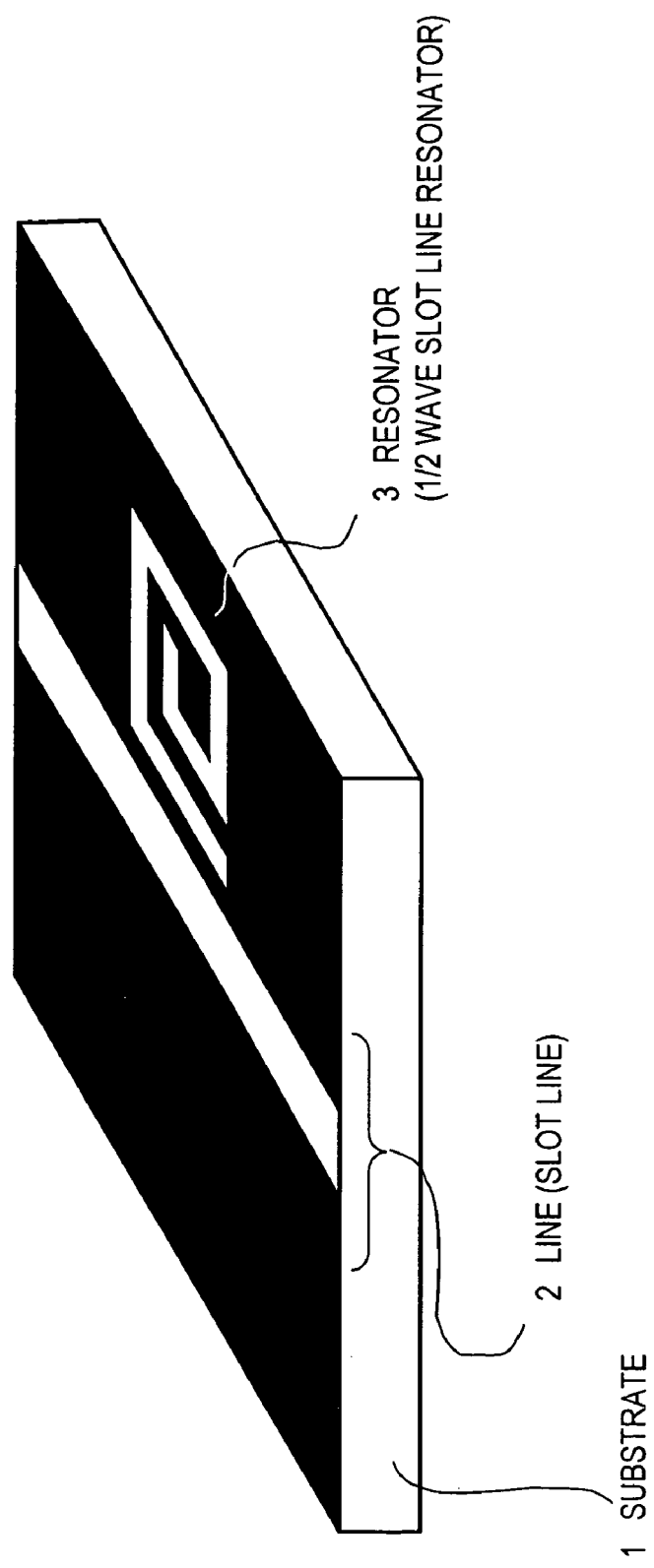
FIG. 14 is a perspective view illustrating a main portion of a demultiplexer including a slot line.

FIG. 14 illustrates a demultiplexer according to the present invention including a slot line. In this example, the straight line is defined as a slot cut through the conductor layer. On the lower surface of the dielectric substrate, a grounded layer (not shown) is removed. The resonator 3 has the same structure as the counterpart shown in FIG. 13.

Figure 15:
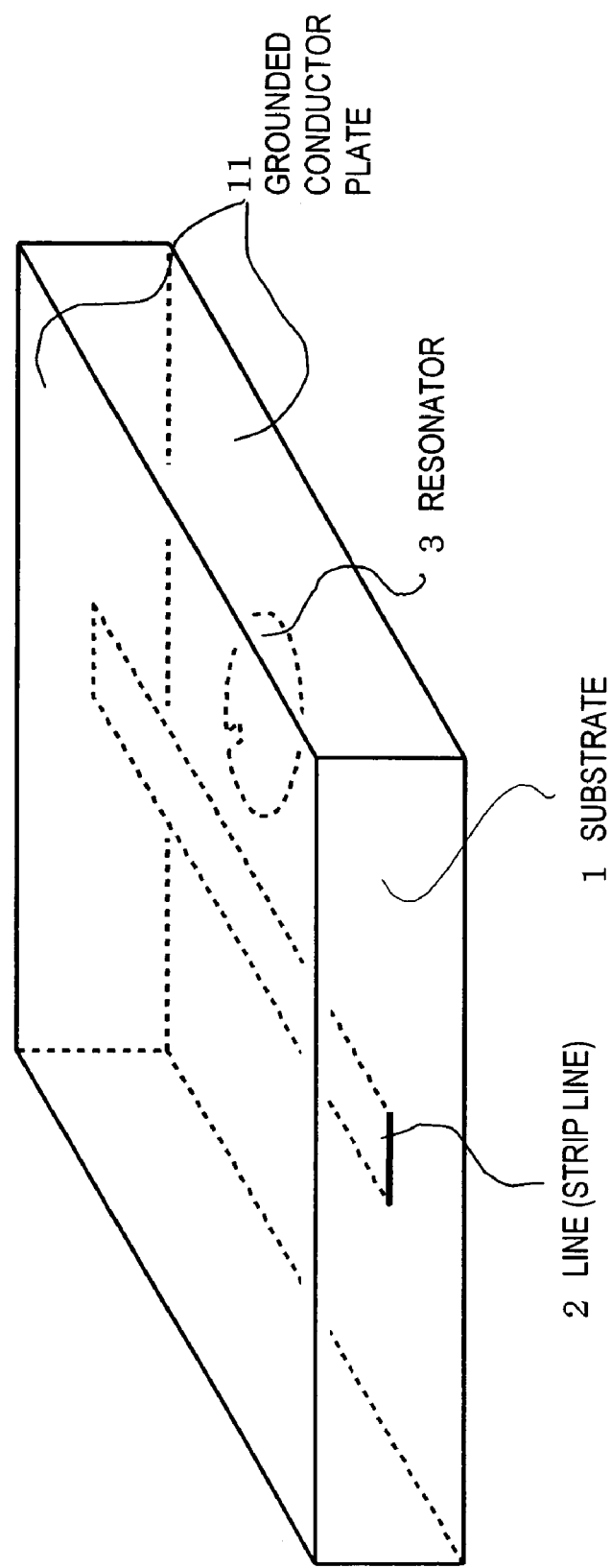
FIG. 15 is a perspective view illustrating a main portion of a demultiplexer including a strip line.

FIG. 15 illustrates a demultiplexer according to the present invention including a strip line. A straight strip line, made of a conductor, is present in the substrate 1. On the upper and lower surfaces of the substrate 1, conductor layers (grounded conductor plates) 11 are provided. The resonator 3 has the same structure as the counterpart shown in FIG. 9.

Figure 16:
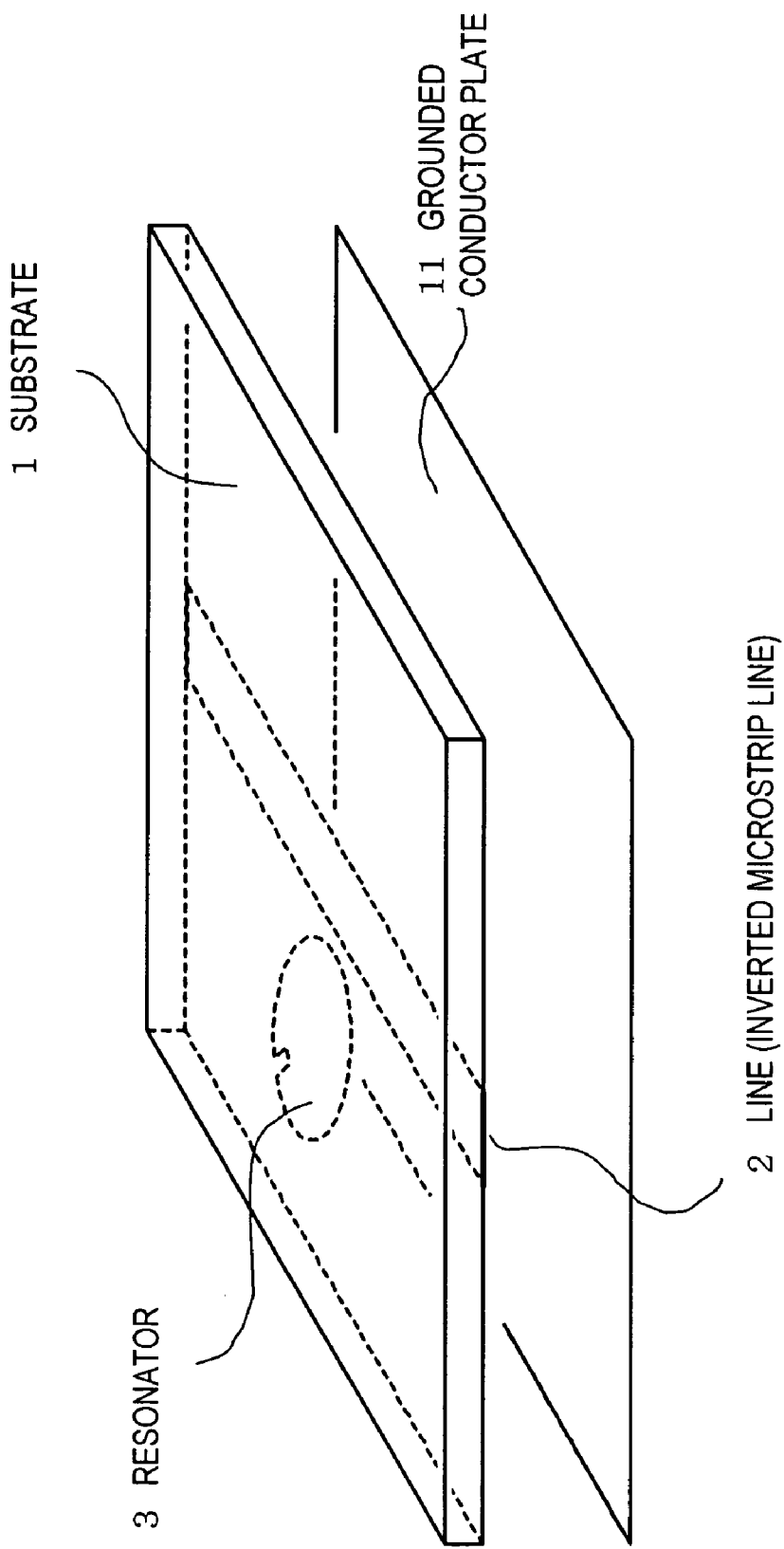
FIG. 16 is a perspective view illustrating a main portion of a demultiplexer including an inverted microstrip line.

FIG. 16 illustrates a demultiplexer according to the present invention including an inverted microstrip line. In the example illustrated in FIG. 16, the line 2 and the resonator 3 are provided on the lower surface of the substrate 1 and a grounded conductor plate 11 is arranged so as to face the line 2 and the resonator 3. The resonator 3 has the same structure as the counterpart shown in FIG. 9.

Figure 17:
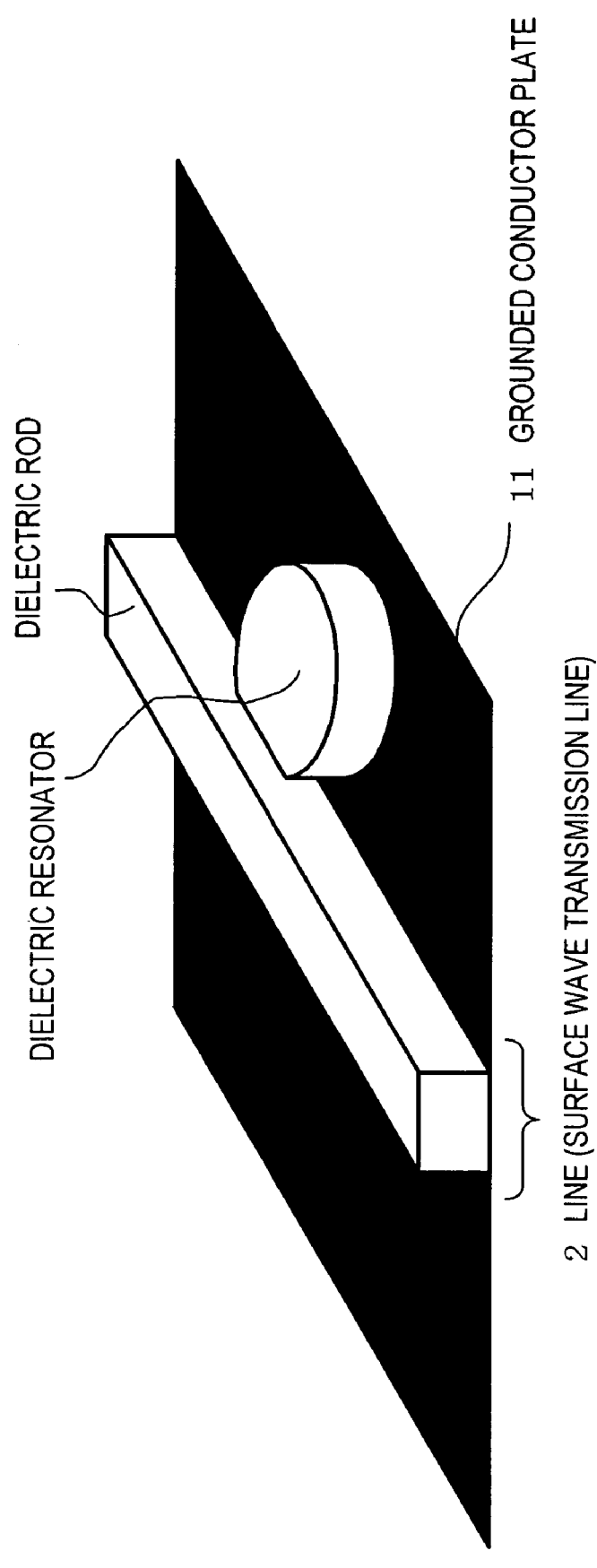
FIG. 17 is a perspective view illustrating a main portion of a demultiplexer including a surface wave transmission line.

FIG. 17 illustrates a demultiplexer according to the present invention including a surface wave transmission line. A dielectric rod and a notched dielectric cylinder, provided on a grounded conductor plate, function as a surface wave transmission line and a dielectric resonator, respectively.

Figure 18:
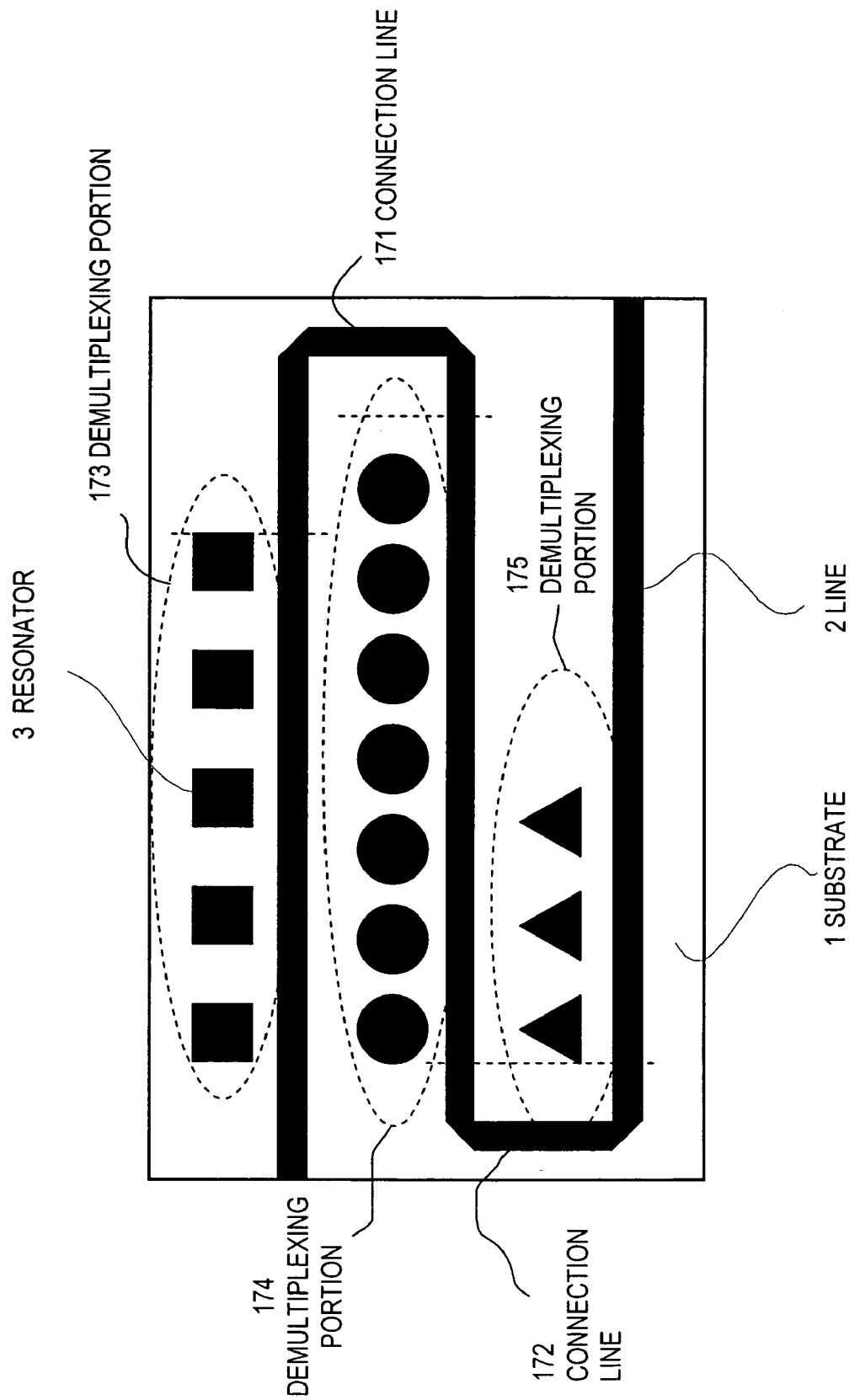
FIG. 18 is a plan view of a demultiplexer, in which a number of demultiplexing areas, each including a plurality of resonators, are connected in series together.

It should be noted that the line 2 does not have to extend straight. Optionally, a bent line 2 may also be used as shown in FIG. 18. In that case, not all of the resonators arranged along the line 2 have to have quite the same configuration. In the example illustrated in FIG. 18, three straight lines 2 are coupled together via connection lines 171 and 172. The line length of the connection lines 171 and 172 is preferably defined so as not to produce resonance in the operating frequency range of the demultiplexer of the present invention, i.e., so as not to be equal to an integral multiple of the propagation wavelength of the line 2 at that operating frequency. This is because if the connection lines 171 and 172 functioned as resonators, then the overall characteristic of the demultiplexer would be affected by the resonances produced by the connection lines 171 and 172.

In the demultiplexer shown in FIG. 18, three demultiplexing portions 173, 174 and 175 are defined. These demultiplexing portions 173, 174 and 175 may have either the same resonator structure or mutually different resonator structures. It is only necessary that after these demultiplexing portions 173, 174 and 175 have been combined together via the connection lines 171 and 172 to form a single demultiplexer, the demultiplexer exhibits its desired characteristic overall. However, if demultiplexing portions with the same structure are used, then the overall size of the demultiplexer can be reduced.

On the other hand, if the respective demultiplexing portions 173, 174 and 175 are designed to operate in mutually different frequency ranges and are combined together via the connection lines, then the operating frequency range of the demultiplexer can be expanded easily. As a result, a demultiplexer, operating in multiple frequency ranges, is realized.

Figure 19A:
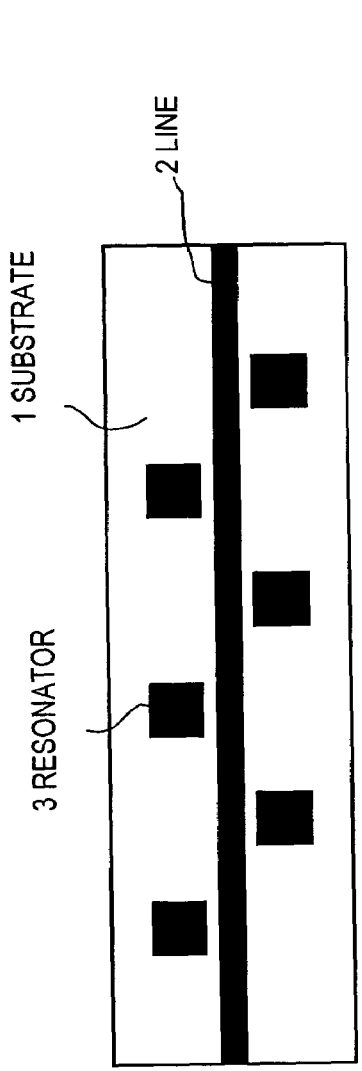
FIG. 19A is a plan view of a demultiplexer that is designed so as to alternately arrange resonators on both sides of a line.

Furthermore, there is no need to arrange the resonators 3 on just one side of the line 2, either. Alternatively, the resonators may also be arranged such that the same resonator is folded with respect to the centerline of the line 2 as an axis of mirror symmetry as shown in FIG. 19A. In that case, the resonators 3 can affect the propagation characteristic of the line 2 more strongly.

Figure 19B:
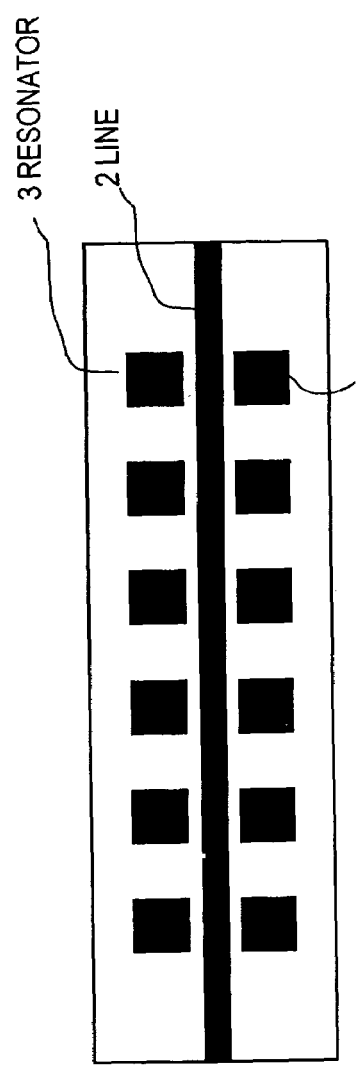
FIG. 19B is a plan view of a demultiplexer that is designed so as to arrange resonators on both sides of a line such that the centerline thereof becomes the axis of mirror symmetry.

Alternatively, the number of resonators arranged on one side of the line 2 may be equal to that of resonators arranged on the other side as shown in FIG. 19B. In that case, leaking components of the electromagnetic field radiated from the resonators 3 on these two sides of the line 2 will have mutually opposite phases, and therefore, components of the electromagnetic field leaking from the front surface of the substrate 1 can be reduced.

Figure 19C:
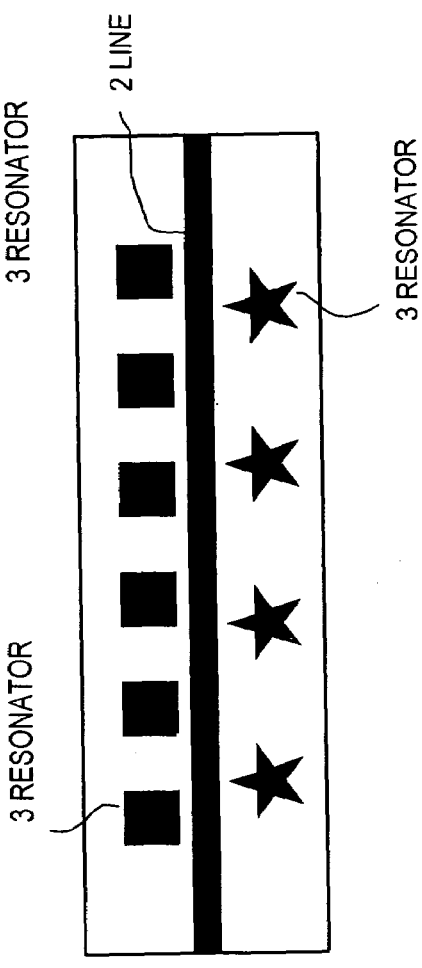
FIG. 19C is a plan view of a demultiplexer that is designed so as to arrange two groups of resonators having two different structures along the centerline of a line.

As another alternative, two groups of resonators with different configurations may be arranged on these two sides of the line 2 at two different intervals as shown in FIG. 19C. Then, the effects produced by the resonators on one side of the line 2 and those produced by the resonators on the other side of the line 2 will enhance each other. In addition, another dispersion characteristic may be newly generated by coupling the resonators on these two sides together. In that case, the variety of the dispersion characteristic can be easily increased advantageously.

Device Including Demultiplexer/Multiplexer of the Invention

Hereinafter, an exemplary system configuration for a device including the demultiplexer/multiplexer of the present invention will be described with reference to FIG. 20.

Figure 20:
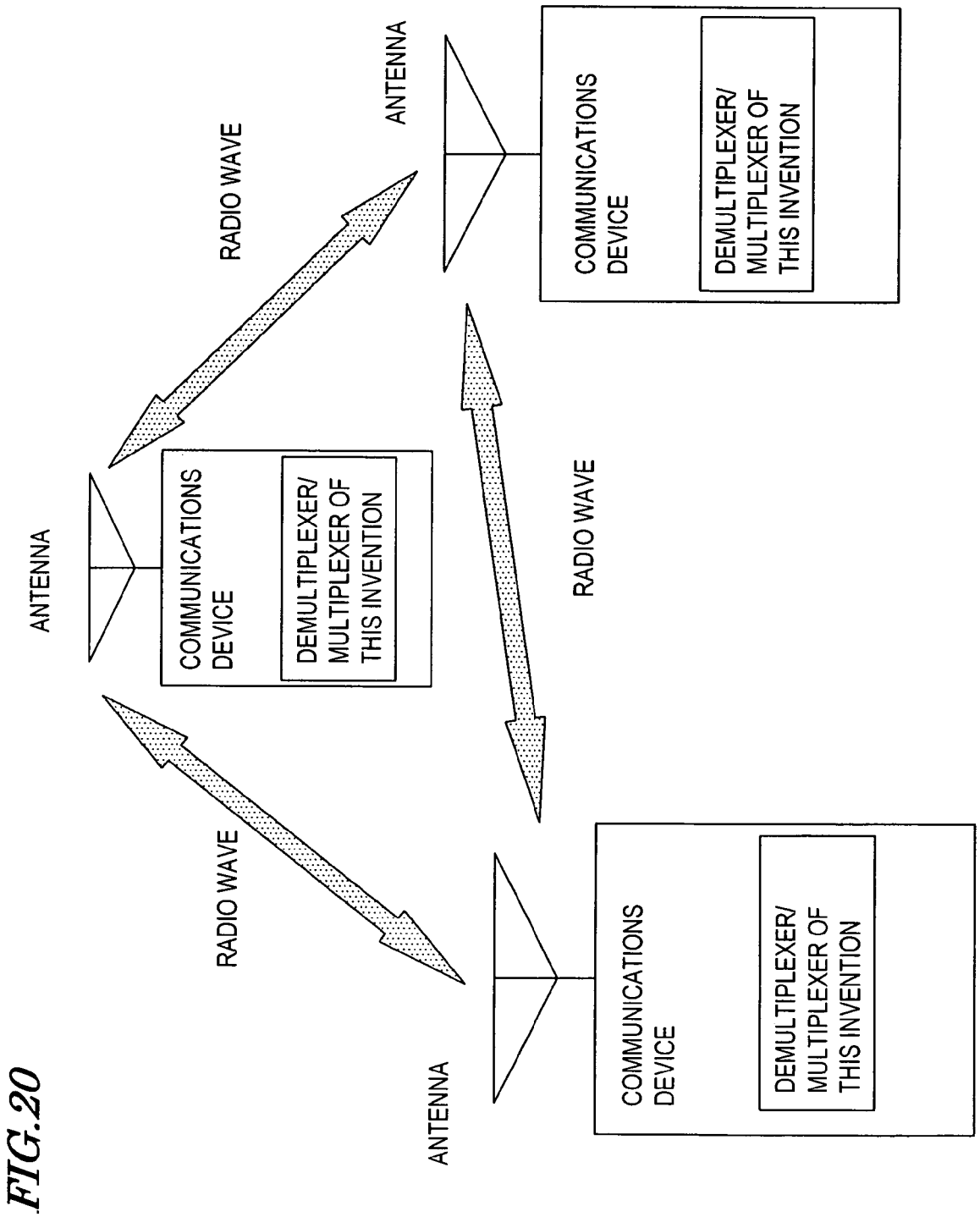
FIG. 20 shows a radio communication system including a communication device in which the demultiplexer/multiplexer of the present invention is built.

FIG. 20 shows a radio communication system including a number of communication devices in each of which the demultiplexer/multiplexer of the present invention is included. In this system, communications are done by means of frequency-multiplexed pulsed signals, and therefore, a huge amount of data can be transmitted between them.

In this preferred embodiment, the communication devices are wireless terminals such as cell phones. However, the present invention is in no way limited to this specific preferred embodiment. Alternatively, any other type of devices may also be used as long as those devices have the function of transmitting and receiving information on radio wave. The demultiplexer/multiplexer of the present invention is broadly applicable, and can achieve all expected effects, without depending on the configuration of any other circuit included in the communication device or the system configuration of the radio communication system itself.

Figure 21:
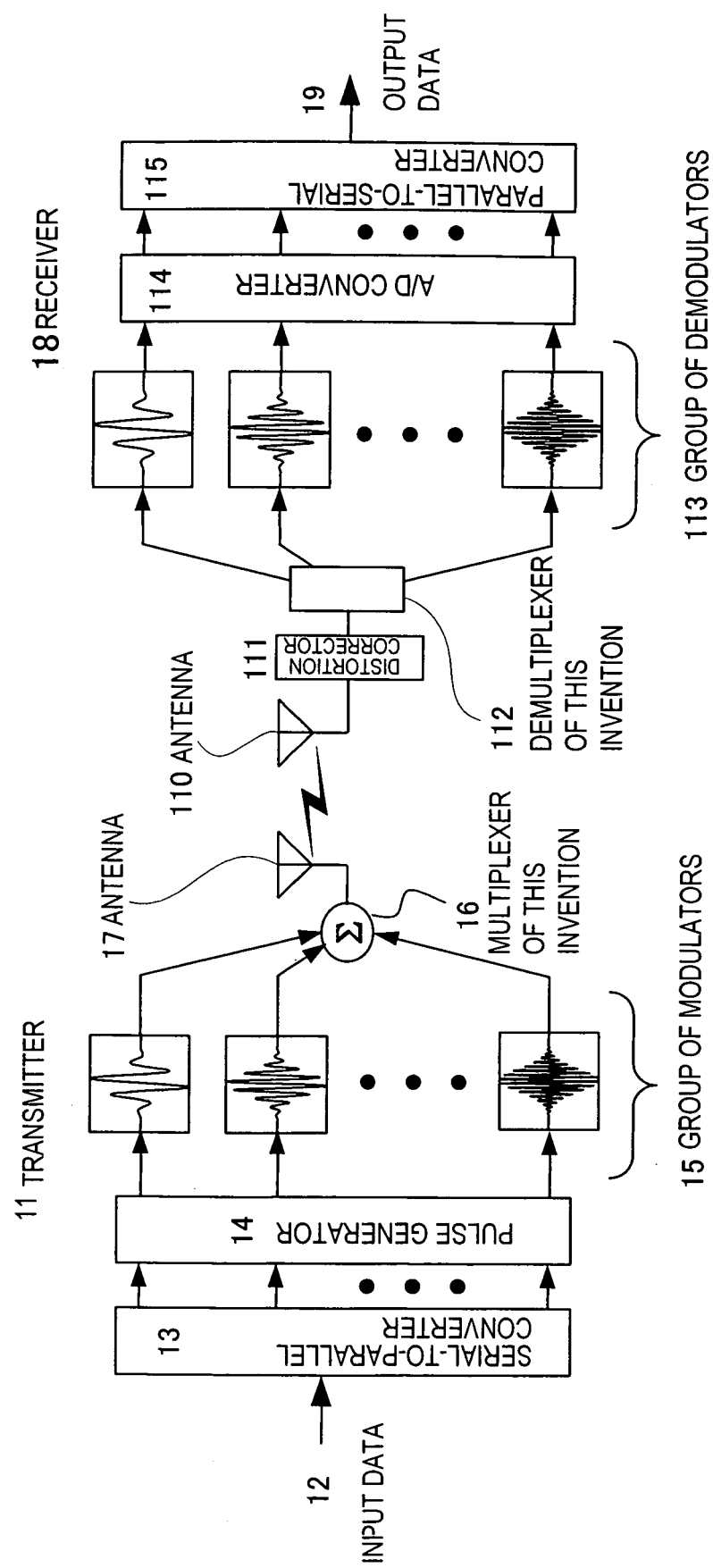
FIG. 21 shows signal processing blocks of communication devices (transmitter and receiver), each including the demultiplexer/multiplexer of the present invention.
Figure 22:
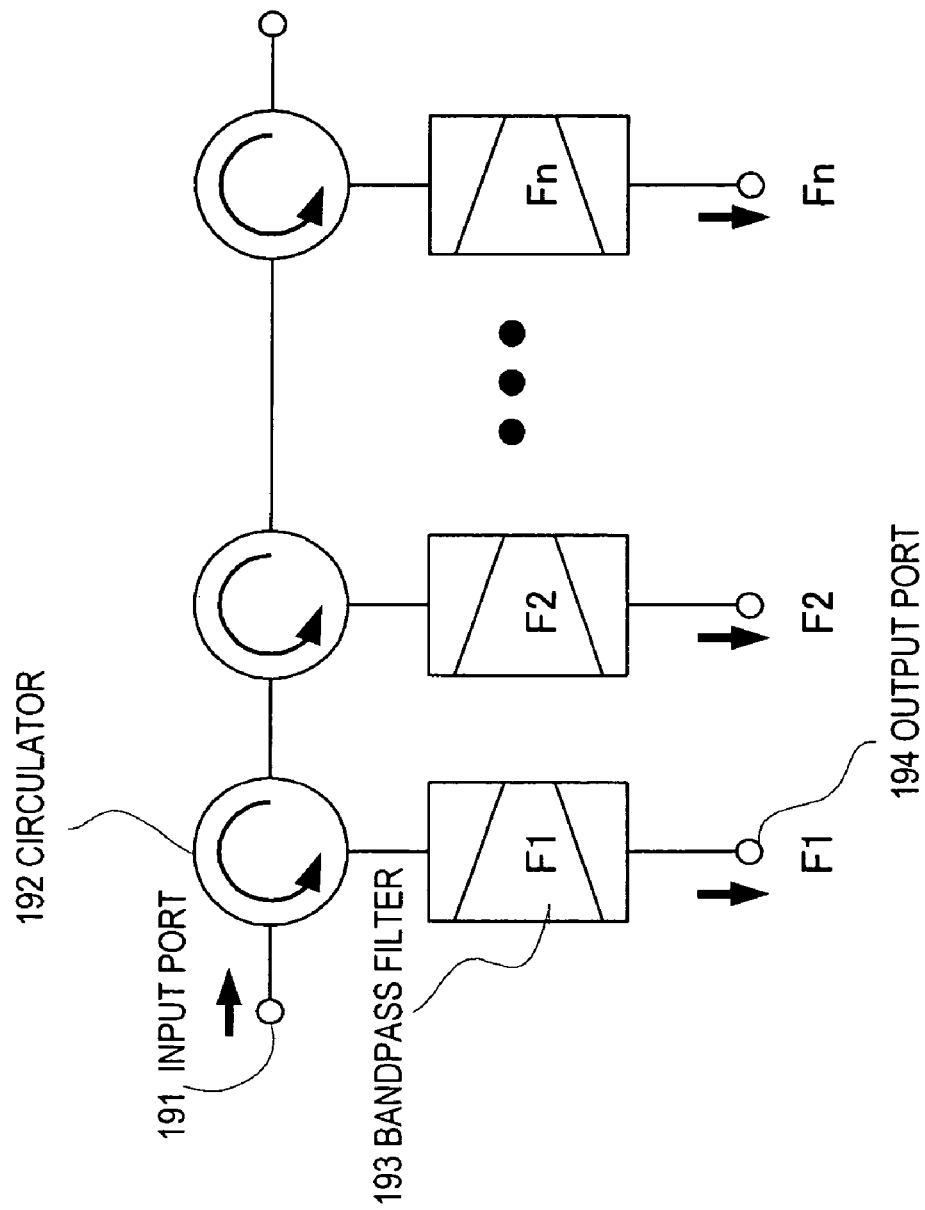
FIG. 22 schematically shows the circuit configuration of a conventional demultiplexer.

Hereinafter, an exemplary configuration for the communication devices will be described with reference to FIG. 21, which shows signal processing blocks of the communication devices (transmitter and receiver), each including the demultiplexer/multiplexer of the present invention.

The transmitter 11 modulates input data 12 into RF signals with pulsed waveforms and then radiates those modulated signals into free space. As shown in FIG. 21, the transmitter 11 includes a serial-to-parallel converter 13, a pulse generator 14, a group of modulators 15, a multiplexer 16 and an antenna 17. The multiplexer 16 is a multiplexer according to any of the preferred embodiments of the present invention described above.

The receiver 18 receives the RF signal with the pulsed waveform, which has propagated through the free space, and demodulates the received signal, thereby reproducing the input data 12 into output data 19. The receiver 18 includes an antenna 110, a distortion corrector 111, the demultiplexer 112 of the present invention, a group of demodulators 113, an A/D converter 114 and a parallel-to-serial converter 115.

Hereinafter, a series of signal processing steps to be carried out after the data 12 is input to the transmitter 11 and then reaches the receiver 18 by the radio transmission technique and until that data 12 is reproduced as the output data 19. The input data 12, consisting of digital signals that are arranged in series along the time base, is extended by the serial-to-parallel converter 13 into a number n of parallel data streams. Each of these parallel data streams is transformed by the pulse generator 14 into a pulsed waveform with a pulse generated with respect to "0" data and with no pulse generated with respect to "1" data, for example. It should be noted that each and every pulse has the same waveform irrespective of the data stream. Thereafter, the group of modulators 15 superposes carrier waves on the converted pulse signals such that those parallel data streams have respectively different frequencies. Then, the respective modulated signals are multiplexed into a single pulse signal by the multiplexer 16 of the present invention with their phases matched with each other and then radiated into the space via the antenna 17.

The multiplexed pulse signal, which has propagated through the air, is received at the antenna 110 and then has its distortions, which have been caused due to the frequency characteristics of the propagation path and the antennas 17 and 110, removed by the distortion corrector 111. Thereafter, by passing the pulse signal through the demultiplexer 112 of the present invention, the multiplexed pulse signal is extended on the time base as described above. Then, the group of n demodulators 113 extracts only pulse signals, of which the frequency components are superposed one upon the other, from the extended signals, and its output is processed by the A/D converter 114, thereby generating a number n of parallel data streams, each consisting of binary data of zeros and ones. Finally, the parallel-to-serial converter 115 converts those data streams into a single data stream in which those data are arranged in series on the time base, thereby generating the output data 19. In this manner, the input data 12 of the transmitter 11 is transmitted to the receiver 18.

These devices and system may be used in not just radio communication between communication devices but also transmission of signals between closely arranged LSI chips.

The demultiplexer and multiplexer of the present invention have a simple circuit configuration but can still divide a multiplexed signal, in which a number of pulsed signals with carriers having different frequencies are superposed one upon the other, on the time base. Thus, the demultiplexer/multiplexer of the present invention can be used effectively as a modulator/demodulator for a frequency-multiplexed pulse communication device.

The device of the present invention can be used effectively in ultra-wideband communications, which will be developed and popularized in the near future.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A demultiplexer for receiving a multiplexed signal, in which a plurality of electrical signals with mutually different frequencies are multiplexed together, and dividing the multiplexed signal into the electrical signals on a time base, the demultiplexer comprising:
at least one line for propagating the multiplexed signal; and
a plurality of resonators arranged along the line,
wherein:
the dispersion characteristic of the line has a nonlinear portion, caused by electromagnetic coupling between the line and the resonators,
the phase velocities of the electrical signals which propagate through the line change according to their frequencies;
the plurality of resonators includes at least three resonators, which are arranged at substantially regular intervals;
the plurality of resonators shares a common structure; and
electromagnetic coupling, produced between each of the resonators and the line, has substantially the same strength for each said resonator.

2. The demultiplexer of claim 1, further comprising at least one more line for electrically coupling selected ones of the resonators together.

3. A demultiplexer for receiving a multiplexed signal, in which a plurality of electrical signals with mutually different frequencies are multiplexed together, and dividing the multiplexed signal into the electrical signals on a time base, the demultiplexer comprising:
at least one line for propagating the multiplexed signal; and
a plurality of resonators arranged along the line,
wherein:
the dispersion characteristic of the line has a nonlinear portion, caused by electromagnetic coupling between the line and the resonators,
the phase velocities of the electrical signals which propagate through the line change according to their frequencies, and
the resonators produce resonances at two or more different frequencies.

4. A demultiplexer for receiving a multiplexed signal, in which a plurality of electrical signals with mutually different frequencies are multiplexed together, and dividing the multiplexed signal into the electrical signals on a time base, the demultiplexer comprising:
at least one line for propagating the multiplexed signal; and
a plurality of resonators arranged along the line,
wherein:
the dispersion characteristic of the line has a nonlinear portion, caused by electromagnetic coupling between the line and the resonators,
the phase velocities of the electrical signals which propagate through the line change according to their frequencies, and
each said resonator is a multi-mode resonator, and produces resonances in mutually independent basic modes at two or more different frequencies.

5. A demultiplexer for receiving a multiplexed signal, in which a plurality of electrical signals with mutually different frequencies are multiplexed together, and dividing the multiplexed signal into the electrical signals on a time base, the demultiplexer comprising:
at least one line for propagating the multiplexed signal; and
a plurality of resonators arranged along the line, wherein:
the dispersion characteristic of the line has a nonlinear portion, caused by electromagnetic coupling between the line and the resonators,
the phase velocities of the electrical signals which propagate through the line change according to their frequencies;
the plurality of resonators includes at least three resonators, which are arranged at substantially regular intervals; and
the interval between the resonators is approximately equal to half of a propagation wavelength at either the highest or lowest one of the frequencies of the electrical signals that are included in the RF signal propagating through the line.

6. A demultiplexer for receiving a multiplexed signal, in which a plurality of electrical signals with mutually different frequencies are multiplexed together, and dividing the multiplexed signal into the electrical signals on a time base, the demultiplexer comprising:
at least one line for propagating the multiplexed signal; and
a plurality of resonators arranged along the line, wherein:
the dispersion characteristic of the line has a nonlinear portion, caused by electromagnetic coupling between the line and the resonators,
the phase velocities of the electrical signals which propagate through the line change according to their frequencies; and
the resonant frequency of the resonators is approximately equal to either the highest or lowest one of the frequencies of the electrical signals that are included in the RF signal propagating through the line.

7. A demultiplexer for receiving a multiplexed signal, in which a plurality of electrical signals with mutually different frequencies are multiplexed together, and dividing the multiplexed signal into the electrical signals on a time base, the demultiplexer comprising:
at least one line for propagating the multiplexed signal; and
a plurality of resonators arranged along the line, wherein:
the dispersion characteristic of the line has a nonlinear portion, caused by electromagnetic coupling between the line and the resonators,
the phase velocities of the electrical signals which propagate through the line change according to their frequencies;
the multiplexed signal is a temporally localized signal generated by superposing a plurality of pulsed signals one upon the other;
the waveform of each said pulsed signal is represented by the product of a signal with a Gaussian waveform and a sine wave signal, and
the pulsed signals have been generated from the sine wave signals with mutually different frequencies.

8. A device comprising:
a demultiplexer for receiving a multiplexed signal, in which a plurality of electrical signals with mutually different frequencies are multiplexed together, and dividing the multiplexed signal into the electrical signals on a time base; and
a circuit for processing the electrical signals, wherein:
the demultiplexer includes at least one line for propagating the multiplexed signal and a plurality of resonators arranged along the line,
the dispersion characteristic of the line has a nonlinear portion, caused by electromagnetic coupling between the line and the resonators,
the phase velocities of the electrical signals which propagate through the line change according to their frequencies, and
the electrical signals are pulse signals and used in ultrawide-band communications.

* * * * *